United States Patent [19]

Ito et al.

[11] Patent Number: 5,420,238

[45] Date of Patent: May 30, 1995

[54] POLY(SILYLENEETHYNYLENE PHENYLENEETHYNYLENES), METHOD FOR PREPARING SAME AND HARDENED PRODUCT THEREOF

[75] Inventors: Masayoshi Ito, Kanagawa; Masahiko Mitsuzuka, Tokyo; Kenji Iwata, Kanagawa; Koji Inoue, Kanagawa; Tetsura Utsumi, Kanagawa, all of Japan

[73] Assignee: Mitsui Toatsu Chemicals, Inc., Tokyo, Japan

[21] Appl. No.: 216,549

[22] Filed: Mar. 23, 1994

[30] Foreign Application Priority Data

Mar. 24, 1993 [JP] Japan ................... 5-064893
Mar. 24, 1993 [JP] Japan ................... 5-064894
Mar. 29, 1993 [JP] Japan ................... 5-069661
Jul. 16, 1993 [JP] Japan ................... 5-176421
Aug. 13, 1993 [JP] Japan ................... 5-201399

[51] Int. Cl.$^6$ ........................................... C08G 77/60
[52] U.S. Cl. .................... 528/481; 528/25; 528/31; 528/32; 528/43; 528/483
[58] Field of Search .............. 528/25, 31, 32, 43, 528/481, 483

[56] References Cited

U.S. PATENT DOCUMENTS 4,923,949  5/1990  Iwahara et al. ................... 528/43
5,241,029  8/1993  Barton et al. .
5,243,060  9/1993  Barton et al. .

FOREIGN PATENT DOCUMENTS 5-345825  12/1993  Japan .

OTHER PUBLICATIONS

Patent Abstracts of Japan, vol. 18, No. 191 (1994).
Journal of Polymer Science, vol. 28, No. 13, pp. 431–437 (1990).
Liu et al, "Copper(I) chloride catalyzed cross-dehydrocoupling...", Canadian J. Chem., vol. 68, 1990, pp. 1100–1105.
Journal of Polymer Science, Part C: Polymer Letters, vol. 28, pp. 431–437 (1990).
The Canadian Journal of Chemistry, vol. 68, pp. 1100–1105 (1989).
Proceedings of the Third Symposium on Organosilicon Material Chemistry, Oct. 29, 1992.

Primary Examiner—Melvyn I. Marquis
Attorney, Agent, or Firm—Burns, Doane, Swecker & Mathis

[57] ABSTRACT

A method for preparing a highly heat-resistant and burning-resistant poly(silyleneethynylene phenyleneethynylene) having a repeated unit represented by the following structural formula (1A):

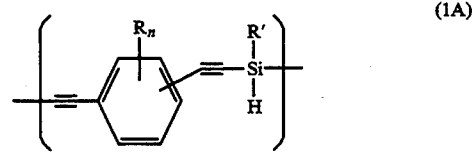

wherein the phenylene group may be in the o-, m- or p-form, R represents a halogen atom or an alkyl group, alkoxy group, phenoxy group, alkenyl group, alkynyl group, aromatic group, disubstituted amino group or silanyl group; n is an integer ranging from 0 to 4; and R' represents a hydrogen atom, an alkyl group, alkenyl group, alkynyl group or aromatic group, a product obtained by the method and a hardened product obtained by heat-treating, at a temperature ranging from 50° to 700° C., the poly(silyleneethynylene phenyleneethynylene).

23 Claims, 12 Drawing Sheets

POLY(SILYLENEETHYNYLENE PHENYLENEETHYNYLENES), METHOD FOR PREPARING SAME AND HARDENED PRODUCT THEREOF

BACKGROUND OF THE INVENTION (a) Field of the Invention

The present invention relates to a novel silicon-containing polymer which is useful as a heat-resistant polymer, a burning-resistant polymer, a conductive polymer and a material for luminescent elements, non-linear elements as well as a method for preparing the silicon-containing polymer and a hardened product of the polymer.

(b) Description of the Prior Art

Recently, there have intensively and widely been conducted studies of heat-resistant polymers such as carbon-based polymers represented by polyimides; and silicon-based polymers such as silicone and polycarbosilane. The silicon-based polymers can molecularly been designed easily since they include bonds of high bonding energy such as Si—O and Si—C or those having high reactivity such as Si—Cl and Si—H. Nevertheless, there have only a few studies of heat-resistant silicon-containing polymers except for silicone. As examples of polycarbosilanes, silicon-containing polymers having structures represented by the following structural formula (6):

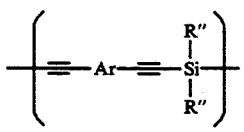

(wherein R" represents a methyl or phenyl group; Ar represents a divalent aromatic group) have been synthesized in the presence of a catalyst such as a Pd catalyst. However, there have been limitations in the means available for the synthesis of these silicon-containing polymers having such structures and starting materials required for the polymerization thereof and therefore, only a few compounds have conventionally been synthesized (see, for instance, Robert J. P. Corriu et al., Journal of Polymer Science: Part C: Polymer Letters, 1990, 28, pp. 431-437). The inventors of this invention have taken note of such polymers which carry, in the main chain, ethynylene groups, aromatic groups and silylene groups and expected that these polymers exhibit high heat resistance and high resistance to burning. Since it would be assumed that physical properties of polymers largely differ from one another depending on the kinds of substituents thereof, the inventors have conducted various studies to develop further improved novel compounds. The inventors have made effort to develop, in particular, compounds having structures represented by the foregoing structural formula (6) in which either or both of the substituents R" on the silicon atom are hydrogen atoms since they can converted into other compounds exhibiting specific physical properties through, for instance, the crosslinking reaction of Si—H groups with ethynylene groups. However, it is difficult to synthesize these compounds according to the method disclosed in the aforementioned article of R. J. P. Corriu et al. because of the specific reactivity of the Si—H bond.

As examples of compounds having Si—H bonds include those synthesized by J. F. Harrod et al. in Canada, which are represented by the structural formula (6) wherein the substituents R" on the silicon atom represent a phenyl group and a hydrogen atom and the aromatic group Ar represents an m-phenylene group and which are prepared by subjecting phenylsilane and m-diethynylbenzene to dehydrogenation polycondensation in the presence of copper chloride and an amine compound as catalytic compounds (Hua Qin Liu and John F. Harrod, The Canadian Journal of Chemistry, Vol. 68, pp. 1100–1105). However, the compound was found to have structural defects in the main chain of the polymer in a high density, due to side reactions of ethynylene portions such as branching and/or crosslinking. These structural defects adversely affect various properties of the polymer such as the heat resistance, resistance to burning, solubility in a solvent and conductivity thereof. For this reason, the inventors of this invention have conducted studies to develop a novel method for the preparation of such a polymer.

The inventors of this invention have conducted various studies to develop a method for synthesizing a compound free of the foregoing structural defects and have already developed a method for preparing a polymer substantially free of the foregoing structural defects, which has a structure represented by the structural formula (6) wherein the substituents R" on the silicon atom represent a phenyl group and a hydrogen atom and the aromatic group Ar represents an m-phenylene group, the method comprising subjecting phenylsilane and m-diethynylbenzene to dehydrogenation polycondensation in the presence of a solid basic catalyst such as magnesia (Japanese Un-examined Patent Publication (hereunder referred to as "J. P. KOKAI") No. Hei 5-345825). In this method, however, the preparation of a polymer wherein two R" are both hydrogen atoms or one of them represents a hydrogen atom and the other represents a methyl group requires the use of gaseous monomers and this makes the preparation operations complicated.

SUMMARY OF THE INVENTION

An object of the present invention is to provide a novel silicon-containing polymer having a structure which can ensure heat resistance and resistance to burning substantially higher than those of the conventional polymers and a method for preparing the same.

Another object of the present invention is to provide a light material (a hardened product) produced from the silicon-containing polymer and excellent in heat resistance and resistance to burning.

The novel silicon-containing polymer according to the present invention is a poly(silyleneethynylene phenyleneethynylene) having a repeated structural unit represented by the following structural formula (1A):

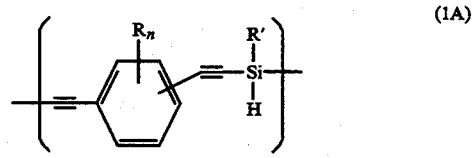

in the general formula (1A), the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; and n is an integer ranging from 0 to 4; the substituent R' of the silylene group represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms when the phenylene group is in the o- or p-form, or the substituent R' is a hydrogen atom, an alkyl group having 1 to 20 carbon atoms, an alkenyl group having 2 to 20 carbon atoms, an alkynyl group having 2 to 20 carbon atoms or an aromatic group having 7 to 20 carbon atoms when the phenylene group is in the m-form and n is 0, or the substituent R' is a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms when the phenylene group is in the m-form and n is an integer ranging from 1 to 4, provided that the hydrogen atoms linked to the carbon atoms of the substituent R' may partially or completely be replaced with halogen atoms, alkoxy groups, phenoxy groups, disubstituted amino groups or silanyl groups.

The novel method according to the present invention comprises reacting an organic magnesium reagent represented by the following structural formula (3):

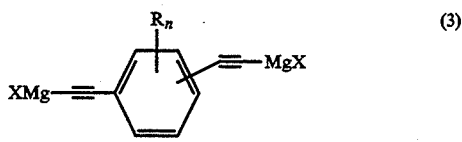

(wherein the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; n is an integer ranging from 0 to 4; and x represents an atom selected from Cl, Br and I) with dichlorosilanes represented by the following structural formula (4):

(wherein the substituent R' represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms, provided that the hydrogen atoms linked to the carbon atoms of the substituent R' may partially or completely be replaced with halogen atoms, alkoxy groups, phenoxy groups, disubstituted amino groups or silanyl groups) in the presence of a solvent free of any active hydrogen atom to give a poly(silyleneethynylene phenyleneethynylene) having a repeated structural unit represented by the following structural formula (1B):

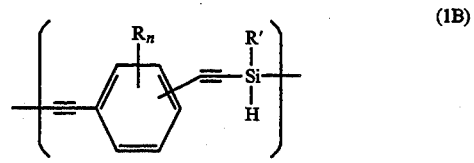

(in the general formula (1B), the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; and n is an integer ranging from 0 to 4; the substituent R' of the silylene group represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms, provided that the hydrogen atoms linked to the carbon atoms of the substituent R' may partially or completely be replaced with halogen atoms, alkoxy groups, phenoxy groups, disubstituted amino groups or silanyl groups).

Moreover, the present invention also relates to a method for preparing a poly(silyleneethynylene phenyleneethynylene) represented by the foregoing structural formula (1B) which comprises reacting, as described above, an organic magnesium reagent represented by the foregoing structural formula (3) with dichlorosilanes represented by the foregoing structural formula (4) in the presence of a solvent free of any active hydrogen atom; then treating the reaction product thus obtained with a monochlorosilane represented by the following structural formula (5):

(wherein $R^1$ to $R^3$ may be identical to or different from one another and each represents a hydrogen atom, an alkyl group having 1 to 20 carbon atoms, an alkenyl group having 2 to 20 carbon atoms, an alkynyl group having 2 to 20 carbon atoms, a phenyl group having 6 to 20 carbon atoms or a silanyl group having 1 to 10 silicon atoms) and finally hydrolyzing the termini of the resulting polymer.

DETAILED DESCRIPTION OF THE INVENTION

Figure 1:
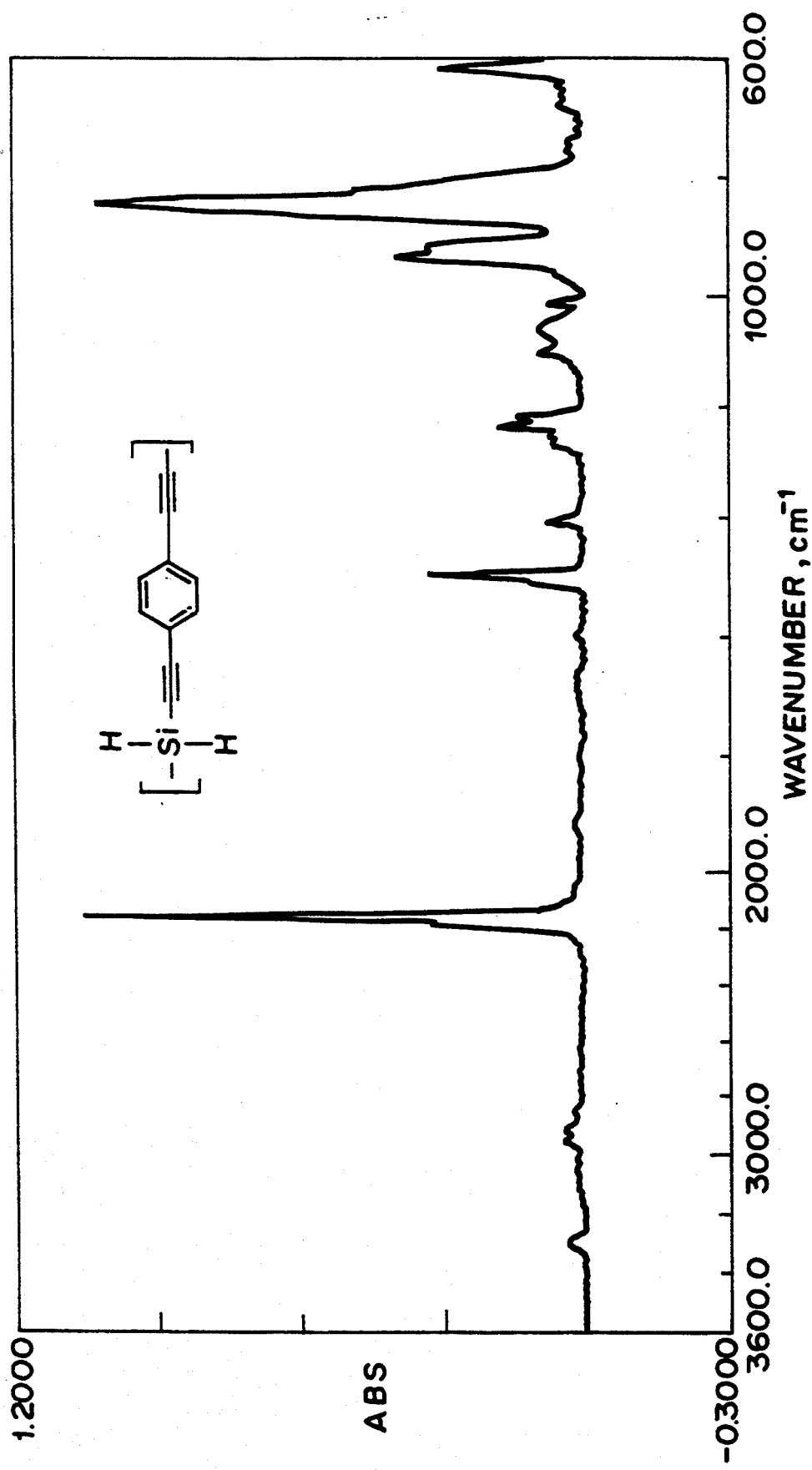
FIG. 1 is a chart showing infrared spectra of the polymer prepared in Example 1.

In short, the preparation method of the present invention is characterized by alternately condensing dichlorosilanes through the reaction thereof in the presence of an organic magnesium reagent as a Grignard reagent as will be seen from the following reaction scheme (7):

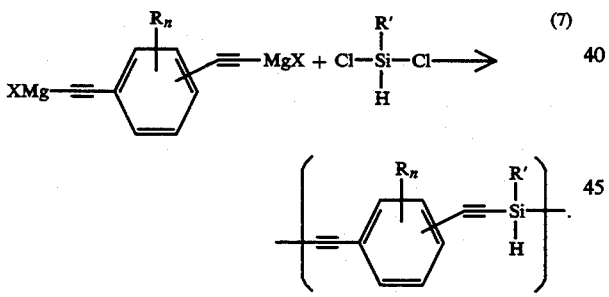

The organic magnesium reagent used in the method of the present invention is a compound which is represented by the following structural formula (3):

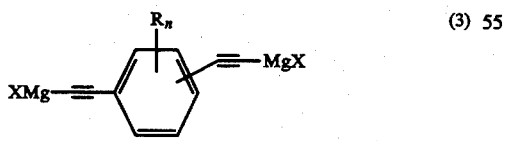

and which is one of the so-called Grignard reagents. The relative position of two ethynylene groups linked to the benzene ring may be in the o-, m- or p-relation. Moreover, the remaining 4 hydrogen atoms on the benzene ring may partially or completely be replaced with substituents R which never take part in the reaction with the Grignard reagent (in other words, n may range from 0 to 4) and examples of such substituents are halogen atoms such as F, Cl, Br and I; alkyl groups having 1 to 20 carbon atoms such as methyl, ethyl, propyl, butyl and cyclohexyl groups; alkoxy groups having 1 to 20 carbon atoms such as methoxy, ethoxy and propoxy groups; phenoxy groups having 6 to 20 carbon atoms such as phenoxy (—OC$_6$H$_5$) and 3,5-dimethylphenoxy (—OC$_6$H$_3$(Me)$_2$) groups; alkenyl groups having 2 to 20 carbon atoms such as vinyl, allyl and cyclohexenyl groups; alkynyl groups having 2 to 20 carbon atoms such as ethynyl, propargyl and phenylethynyl groups; aromatic groups having 6 to 20 carbon atoms such as phenyl, toluyl and mesityl groups; disubstituted amino groups having 2 to 20 carbon atoms such as dimethylamino, diethylamino, ethylmethylamino and methylphenylamino groups; and silanyl groups having 1 to 10 silicon atoms such as silyl (—SiH$_3$), disilanyl (—Si$_2$H$_5$), dimethylsilyl (—SiMe$_2$H), trimethylsilyl (—SiMe$_3$) and tetramethyldisilanyl (—Si$_2$Me$_4$H) groups. Moreover, the hydrogen atoms linked to the carbon atoms of the substituent R may partially or completely be replaced with substituents which never take part in the reaction with the Grignard reagent, for instance, halogen atoms such as F, Cl, Br and I; alkoxy groups such as methoxy, ethoxy and propoxy groups; phenoxy groups such as phenoxy and 3,5-dimethylphenoxy groups; disubstituted amino groups such as dimethylamino, diethylamino, ethylmethylamino and methylphenylamino groups; and silanyl groups such as silyl, disilanyl, dimethylsilyl, trimethylsilyl and tetramethyldisilanyl groups. In the foregoing structural formula (3), X is Cl, Br or I. This is because, it is very difficult to prepare the Grignard reagents in which X is F and thus they are not favorable from the industrial standpoint.

Specific examples of the organic magnesium reagents used in the present invention are organic magnesium reagents having o-phenylene groups such as those represented by the following structural formulae (8) to (10):

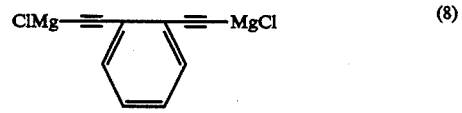

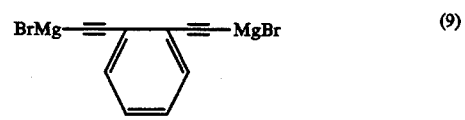

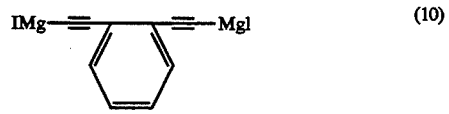

organic magnesium reagents having m-phenylene groups such as represented by the following structural formulae (11) to (13):

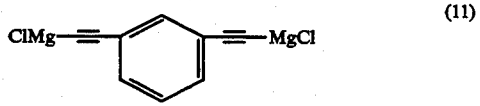

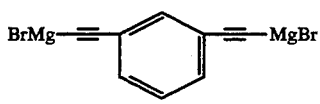 (12)

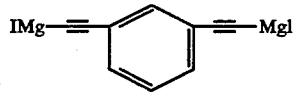 (13)

organic magnesium reagents having p-phenylene groups such as represented by the following structural formulae (14) to (16):

 (14)

 (15)

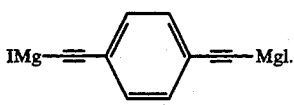 (16)

Moreover, specific examples of the organic magnesium reagents in which the phenylene group has substituents are those represented by the following structural formulae (17) to (20):

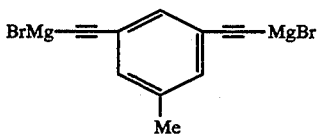 (17)

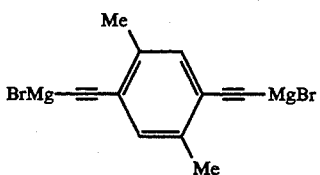 (18)

 (19)

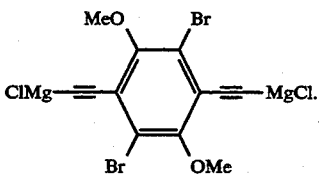 (20)

The dichlorosilanes used in the present invention are those represented by the following structural formula (4):

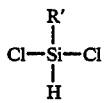 (4)

wherein R' is a substituent which does not take part in the reaction with the Grignard reagent and specific examples thereof include a hydrogen atom; alkyl groups having 1 to 20 carbon atoms such as methyl, ethyl, propyl, butyl and cyclohexyl groups; alkenyl groups having 2 to 20 carbon atoms such as vinyl, allyl and cyclohexenyl groups; alkynyl groups having 2 to 20 carbon atoms such as ethynyl, propargyl and phenylethynyl groups; and aromatic groups having 6 to 20 carbon atoms such as phenyl, toluyl and mesityl groups.

If the substituent R' is a group other than hydrogen atom, the substituent R' has hydrogen atoms linked to the carbon atom(s). The hydrogen atoms linked to the carbon atom(s) may partially or completely be replaced with substituents which never take part in the reaction with the Grignard reagent, for instance, halogen atoms such as F, Cl, Br and I; alkoxy groups such as methoxy, ethoxy and propoxy groups; phenoxy groups such as phenoxy and 3,5-dimethylphenoxy groups; disubstituted amino groups such as dimethylamino, diethylamino, ethylmethylamino and methylphenylamino groups; and silanyl groups such as silyl, disilanyl, dimethylsilyl, trimethylsilyl and tetramethyldisilanyl groups.

The dichlorosilanes may be replaced with corresponding difluorosilanes, dibromosilanes and/or diiodosilanes, but the use of dichlorosilanes is preferred from the economical standpoint.

The dichlorosilanes used in the present invention will hereunder be explained while giving examples thereof.

The dichlorosilane whose substituents R' are hydrogen atoms is dichlorosilane ($SiCl_2H_2$).

Examples of dichlorosilanes whose substituent(s) R' is an alkyl groups include dichloromethylsilane ($MeSiCl_2H$), dichloroethylsilane ($EtSiCl_2H$), dichlorocyclopentylsilane ($c$-$C_5H_9SiCl_2H$), dichlorocyclohexylsilane ($c$-$C_6H_{11}SiCl_2H$), dichlorododecylsilane ($n$-$C_{12}H_{25}SiCl_2H$), dichloro(chloromethyl) silane ($CClH_2SiCl_2H$), dichloro(dichloromethyl)silane ($CCl_2HSiCl_2H$), dichloro(trichloromethyl)silane ($CCl_3SiCl_2H$), dichloro(trifluoromethyl)silane ($CF_3SiCl_2H$), dichloro(2-trifluoromethylethyl)silane ($CF_3(CH_2)_2SiCl_2H$), dichloromethoxymethylsilane ($CH_3OCH_2SiCl_2H$), dichloro(3-methoxypropyl)silane ($CH_3O(CH_2)_3SiCl_2H$) and dichloro(3-(N,N-diethylamino)propyl)silane ($Et_2N(CH_2)_3SiCl_2H$).

Examples of dichlorosilanes whose substituent(s) R' is an alkenyl group include dichlorovinylsilane ($CH_2=CHSiCl_2H$), allyldichlorosilane ($CH_2=CHCH_2SiCl_2H$) and dichloro(2-(3-cyclohexenyl)ethyl)silane represented by the following structural formula (21):

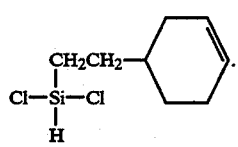 (21)

Examples of dichlorosilanes whose substituent(s) R' is an alkynyl group include dichloroethynylsilane ($CH\equiv CSiCl_2H$), dichloropropargyl-silane (CH≡CCH₂SiCl₂H) and dichloro(phenylethyl)silane (PhCH≡CSiCl₂H).

Examples of dichlorosilanes whose substituent(s) R' is an aromatic group include dichlorophenylsilane (PhSiCl₂H), dichloro-p-toluylsilane represented by the following structural formula (22):

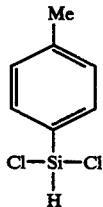
(22)

dichloromesitylsilane represented by the following structural formula (23):

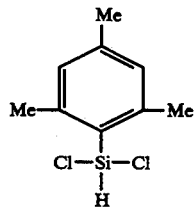
(23)

dichlorobenzylsilane (PhCH₂SiCl₂H), dichloro(2-phenylethyl) silane (Ph(CH₂)₂SiCl₂H), dichloro(3-phenylpropyl)silane (Ph(CH₂)₃SiCl₂H), dichloro(m-bromo)phenylsilane represented by the following structural formula (24):

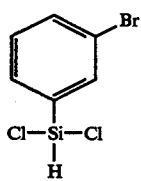
(24)

dichloro(p-chloromethyl)phenylsilane represented by the following structural formula (25):

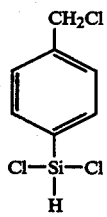
(25)

and dichloro(3-(4-methoxyphenyl)propyl)silane represented by the following structural formula (26).

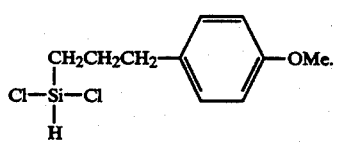
(26)

The monochlorosilanes used in the present invention in the post-treatment are those represented by the following structural formula (5):

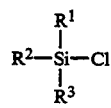
(5)

wherein $R^1$ to $R^3$ may be identical to or different from one another and each represents a hydrogen atom, an alkyl group having 1 to 20 carbon atoms such as a methyl, ethyl, propyl, butyl or cyclohexyl group, an alkenyl group having 2 to 20 carbon atoms such as a vinyl, allyl or cyclohexenyl group, an alkynyl group having 2 to 20 carbon atoms such as an ethynyl, propargyl or phenylethynyl group, a phenyl group having 6 to 20 carbon atoms such as a phenyl, toluyl or mesityl group or a silanyl group having 1 to 10 silicon atoms such as a silyl, disilanyl, dimethylsilyl, trimethylsilyl or tetramethyldisilanyl group). Specific examples of the monochlorosilanes are chlorotrimethylsilane (Me₃SiCl), chlorodimethylsilane (Me₂SiClH), chloromethylsilane (MeSiClH₂), chlorotriethylsilane (Et₃SiCl), chlorodiethylsilane (Et₂SiClH), chloroethylsilane (EtSiClH₂), chlorocyclohexylsilane (c-C₆H₁₁SiClH₂), chlorooctylsilane (C₈H₁₇SiClH₂), chlorodimethylvinylsilane (Me₂(CH₂=CH)SiCl), chloroethynyldimethylsilane (Me₂(HC≡C) SiCl), chlorodimethylphenylsilane (Me₂PhSiCl), chlorophenylsilane (PhSiClH₂) and chloropentamethyldisilane ((Me₃Si)Me₂SiCl).

In the preparation method of the present invention, each intended silicon-containing polymer can be prepared by appropriately selecting an organic magnesium reagent and a dichlorosilane depending on the structure of the intended polymer and then reacting the selected starting materials. Combinations of organic magnesium reagents and dichlorosilanes as well as silicon-containing polymers produced from the combinations will be hereunder explained while giving specific examples, but the compounds of the present invention are not restricted to the following specific examples at all. For instance, an organic magnesium reagent having an o-phenylene group represented by the foregoing structural formula (8), (9) or (10) is reacted with dichlorosilane (SiCl₂H₂) to give poly(silyleneethynylene-1,2-phenyleneethynylene) represented by the following structural formula (27):

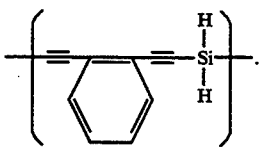
(27)

An organic magnesium reagent having an m-phenylene group represented by the foregoing structural formula (14), (15) or (16) is reacted with dichlorosilane (SiCl₂H₂) to give poly (silyleneethynylene-1,3-phenyleneethynylene) represented by the following structural formula (2):

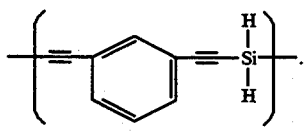
(2)

An organic magnesium reagent having an p-phenylene group represented by the foregoing structural formula (11), (12) or (13) is reacted with dichlorosilane (SiCl₂H₂) to give poly(silyleneethynylene-1,4-phenyleneethynylene) represented by the following structural formula (28):

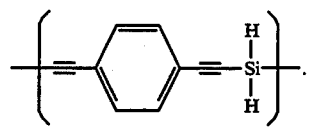
(28)

An organic magnesium reagent having an o-phenylene group represented by the foregoing structural formula (8), (9) or (10) is reacted with dichloromethylsilane (MeSiCl₂H) to give poly(methylsilyleneethynylene-1,2-phenyleneethynylene) represented by the following structural formula (29):

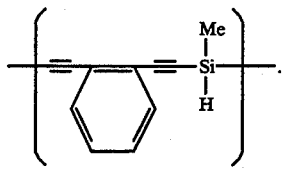
(29)

An organic magnesium reagent having an m-phenylene group represented by the foregoing structural formula (11), (12) or (13) is reacted with dichloromethylsilane (MeSiCl₂H) to give poly(methylsilyleneethynylene-1,3-phenyleneethynylene) represented by the following structural formula (30):

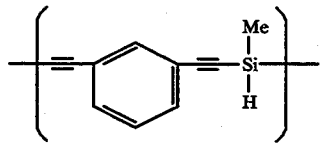
(30)

An organic magnesium reagent having an p-phenylene group represented by the foregoing structural formula (14), (15) or (16) is reacted with dichloromethylsilane (MeSiCl₂H) to give poly(methylsilyleneethynylene-1,4-phenyleneethynylene) represented by the following structural formula (31):

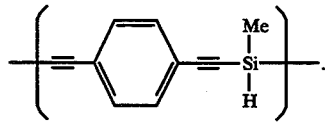
(31)

An organic magnesium reagent having an o-phenylene group represented by the foregoing structural formula (8), (9) or (10) is reacted with dichlorophenylsilane (PhSiCl₂H) to give poly(phenylsilyleneethynylene-1,2-phenyleneethynylene) represented by the following structural formula (32):

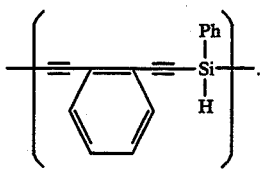
(32)

An organic magnesium reagent having an m-phenylene group represented by the foregoing structural formula (11), (12) or (13) is reacted with dichlorophenylsilane (PhSiCl₂H) to give poly(phenylsilyleneethynylene-1,3-phenyleneethynylene) represented by the following structural formula (33):

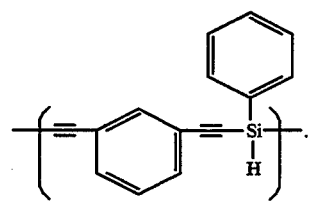
(33)

An organic magnesium reagent having an p-phenylene group represented by the foregoing structural formula (14), (15) or (16) is reacted with dichlorophenylsilane (PhSiCl₂H) to give poly(phenylsilyleneethynylene-1,4-phenyleneethynylene) represented by the following structural formula (34):

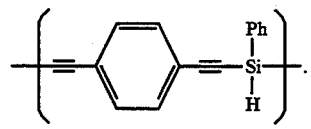
(34)

Silicon atom-containing polymers other than those listed above can likewise be prepared from corresponding combination of organic magnesium reagents with dichlorosilanes. Some of them will be listed below by way of example. Examples of compounds in which each substituent R' on the silylene group is an alkyl group are poly(cyclohexylsilyleneethynylene-1,3-phenyleneethynylene) represented by the following structural formula (35):

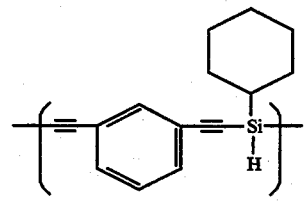
(35)

and poly(dodecylsilyleneethynylene-1,4-phenyleneethynylene) represented by the following structural formula (36):

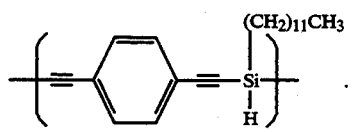 (36)

Examples of compounds in which each substituent R' on the silylene group is an alkenyl group are poly(vinylsilyleneethynylene-1,3-phenyleneethynylene) represented by the following structural formula (37):

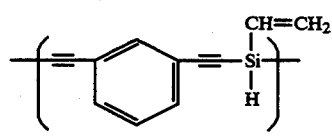 (37)

and poly(allylsilyleneethynylene-1,4-phenyleneethynylene) represented by the following structural formula (38):

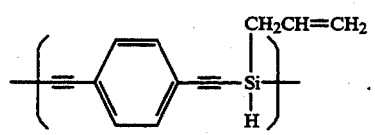 (38)

Examples of compounds in which each substituent R' on the silylene group is an alkynyl group are poly(ethynylsilyleneethynylene-1,3-phenyleneethynylene) represented by the following structural formula (39):

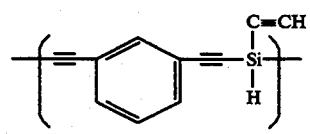 (39)

and poly(phenylethynylsilyleneethynylene-1,4-phenyleneethynylene) represented by the following structural formula (40):

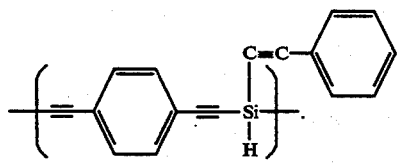 (40)

Examples of compounds in which each substituent R' on the silylene group is an aromatic group are poly(p-toluylsilyleneethynylene-1,3-phenyleneethynylene) represented by the following structural formula (41):

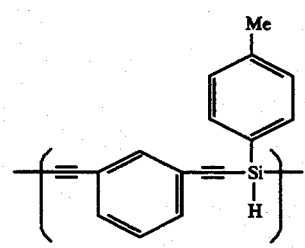 (41)

and poly(phenethylsilyleneethynylene-1,4-phenyleneethynylene) represented by the following structural formula (42):

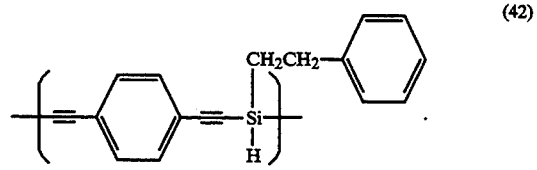 (42)

In addition, examples of compounds in which the hydrogen atoms on the phenylene group are replaced with substituents R are poly(methylsilyleneethynylene-1,4-(2,5-dimethylphenylene) ethynylene) represented by the following structural formula (43):

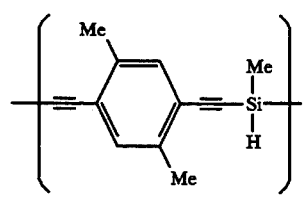 (43)

poly(phenylsilyleneethynylene-1,4-(2,5-dimethoxyphenylene) ethynylene) represented by the following structural formula (44):

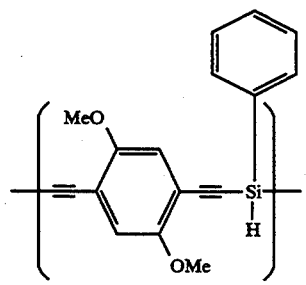 (44)

poly(silyleneethynylene-1,4-(2,5-dimethoxy-3,6-dibromophenylene)ethynylene) represented by the following structural formula (45):

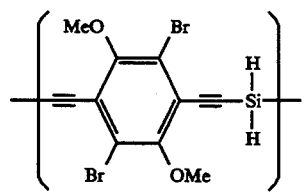 (45)

and poly(phenylsilyleneethynylene-1,3-(5-methylphenylene) ethynylene) represented by the following structural formula (46):

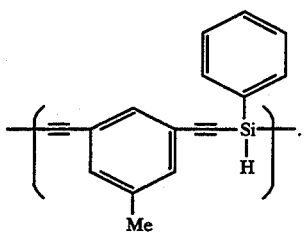
(46)

Moreover, the hydrogen atoms on the silylene group R' may be replaced with, for instance, halogen atoms, alkoxy groups, phenoxy groups, disubstituted amino groups and/or silanyl groups and examples thereof include poly(3,3,3-trifluoropropylsilyleneethynylene-1,2-phenyleneethynylene) represented by the following structural formula (47):

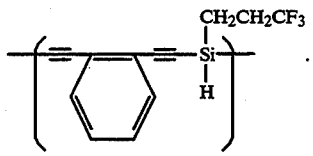
(47)

The method for preparing poly(silyleneethynylene phenyleneethynylene) polymers according to the present invention will hereunder be explained in more detail.

A reactor used herein comprises, for instance, containers for storing raw materials; a reaction vessel; means for feeding the raw materials to the reaction vessel while controlling the flow rates of the raw materials; a means for feeding a solvent to the reaction vessel; a device for controlling the internal pressure of the reaction vessel to a predetermined level; a device for cooling the solvent evaporated from the reaction vessel and for recycling the condensed solvent back to the reaction vessel; a stirring machine for stirring the contents of the reaction vessel; and a device for determining and controlling the temperature in the reaction vessel.

In carrying out the method of the invention, the reaction vessel is first filled with a dry solvent and either an organic magnesium reagent or dichlorosilanes as the first raw material and the other second raw material is introduced into the reaction vessel while adjusting the temperature of the contents of the reaction vessel to a desired reaction temperature with sufficient stirring and controlling the flow rate of the second raw material so as not to cause an excessive increase in the reaction temperature. Alternatively, the reaction vessel is filled with a dry solvent and then an organic magnesium reagent and dichlorosilanes as raw materials are simultaneously introduced into the reaction vessel while adjusting the temperature of the contents of the reaction vessel to a desired reaction temperature with sufficient stirring and controlling the flow rates of the raw materials so as not to cause an excessive increase in the reaction temperature. If a raw material used is dichlorosilane ($SiCl_2H_2$) which is in a gaseous state at ordinary temperature and pressure, it is introduced into the reaction vessel preferably, but not essential, by setting up an opening of a tube for introducing a gas into the reaction vessel below the level of a solvent so that the introduced dichlorosilane sufficiently comes into contact with the solvent. After completing the mixing of these raw materials, the contents in the reaction vessel are further continuously stirred while controlling the temperature thereof to a predetermined post-reaction temperature. After a predetermined reaction time, the reaction solution is subjected to a desired post-treatment, then the reaction product is removed from, for instance, by-products and the solvent used and finally purified.

The organic magnesium reagents used as starting materials have widely been known as the Grignard reagents of acetylene compounds. The method for preparing these reagents is not restricted to specific ones and those used in the usual Grignard reactions may be used.

The mixing ratio of the organic magnesium reagent to the dichlorosilanes used as the raw materials is desirably such that the amount of the dichlorosilanes ranges from 0.5 to 2 moles and preferably 0.7 to 1.3 mole per mole of the organic magnesium reagent.

The solvent used in the reaction may be those commonly used in the Grignard reaction and free of active hydrogen atom capable of reacting with the Grignard reagents, for instance, ether solvents such as tetrahydrofuran (hereunder referred to as "THF"), diethyl ether, dioxane, tetrahydropyran, isopropyl ether and n-butyl ether, saturated hydrocarbon solvents such as n-pentane, n-hexane, cyclohexane and n-heptane, and aromatic hydrocarbon solvents such as benzene, toluene, xylene and mesitylene. Among these, ether solvents are preferred. This is because they can make the reaction operations easy and ensure high activity of the reaction. In this respect, the moisture present in the solvent inhibits the reaction and therefore, it is preferred to use a solvent which is dehydrated in advance and distilled. The method for dehydration is not restricted to specific ones and the solvent can be dehydrated and dried by the methods commonly used, for instance, the use of a dehydrating agent such as a metal hydride.

The amount of the solvent desirably ranges from 5 to 500 ml and preferably 5 to 100 ml per one gram of the dichlorosilanes used.

The reaction temperature desirably ranges from $-80°$ to $120°$ C. and preferably $-30°$ to $40°$ C. when introducing raw materials into a reaction vessel. It desirably ranges from $-80°$ to $120°$ C. and preferably $0°$ to $80°$ C. during the post-reaction.

The reaction may be performed at a reduced pressure or ordinary pressure or under pressure, with the use of ordinary pressure being preferred.

The reaction time varies depending on the amounts of charged raw materials and a solvent and the post-reaction temperature, but desirably ranges from 0.5 to 100 hours.

The post-treatment used herein will be detailed below. The post-treatment may be identical to that used for the treatment of the product formed through the usual Grignard reaction. Some examples are listed below. The reaction solution obtained after the post-reaction comprises a small amount of unreacted dichlorosilanes. In addition, highly hydrolyzable chlorine atoms still remain on the termini of the resulting polymer molecules. In this respect, there has generally been known a method which comprises adding a small amount of an alcohol such as methanol or an organometal reagent such as methyl lithium to a reaction solution as capping agents prior to a hydrolyzation treatment, reacting them at a temperature ranging from $-30°$ C. to room temperature for several minutes to several hours and then carrying out the usual hydrolyzation treatment performed after the Grignard reaction using an ammonium chloride aqueous solution or a hydrochloric acid aqueous solution (see, for instance, J. L. Brefort et al., Organometallics, 1992, 11, p. 2500). Moreover, the inventors of this invention have found out that the resulting polymer can be stabilized by adding monochlorosilanes to the reaction solution which is not subjected to the foregoing post-treatment and hydrolyzing the mixture with a saturated ammonium chloride aqueous solution or an acidic aqueous solution. The amount of the monochlorosilane to be added desirably ranges from about 0.01 to 100 moles and preferably 0.1 to 10 moles per one mole of the dichlorosilanes used as raw materials. The acidic aqueous solution is not restricted to specific ones, but effectively used are about 0.01 to 10N, preferably about 0.1 to 1N acidic aqueous solutions of hydrochloric acid, sulfuric acid or acetic acid. The amount of the aqueous solution used in the hydrolysis is not limited to a specific range, but desirably ranges from about 0.1 to 100l, preferably about 0.2 to 10l per liter of the reaction solution. Alternatively, it is also possible to hydrolyze the reaction solution immediately after the reaction without using any capping agent, but in this case, the resulting polymer often contains siloxane.

The method for separating and purifying the reaction product is not restricted to specific ones and may be those used for separating and purifying the product prepared through the usual Grignard reaction (see, for instance, the articles listed above). The method for separating and purifying the reaction product will be detailed below while giving an example. The reaction solution obtained after the post-treatment causes phase-separation into an organic phase and an aqueous phase and accordingly, the organic phase can easily be separated from the aqueous phase. If the phase separation is insufficient, an organic solvent having a low polarity such as benzene or n-hexane to the reaction solution to thus ensure more complete phase separation. The organic phase thus separated is subjected to the usual drying treatment, for instance, dehydration with a neutral or weakly acidic dehydrating agent such as sodium sulfate, followed by separation of the dehydrating agent through filtration and removal of the solvent by means of, for instance, distillation under reduced pressure to give a crude polymer product. The resulting crude polymer can be purified by dispersing in a poor solvent to thus precipitate the polymer.

The molecular weight of the resulting polymer varies depending on, for instance, the mixing ratio of the raw materials used, the amounts and the kinds of the solvents used and the reaction temperature, but the weight-average molecular weight in general ranges from about 500 to 1,000,000 as determined by gel permeation chromatography (hereunder referred to as "GPC") using polystyrene as a reference material.

The novel poly(silyleneethynylene phenyleneethynylenes) according to the present invention have repeating units represented by the structural formula (1B), are formed through reactions of organic magnesium reagents represented by the structural formula (3) with dichlorosilanes represented by the structural formula (4) in the presence of solvents free of active hydrogen atom and are free of structural defects formed on the main chains through, for instance, branching and/or crosslinking. Specific examples thereof include those represented by structural formulae (2), (27) to (47), the following structural formula (48):

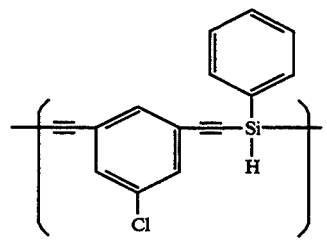

the following structural formula (49):

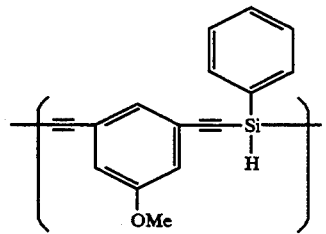

the following structural formula (50):

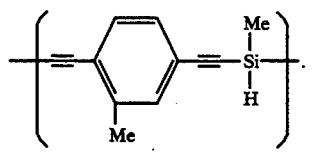

The poly(silyleneethynylene phenyleneethynylenes) according to the present invention mainly comprise the repeating units represented by the foregoing structural formulae and specifically the main chain of each polymer is occupied by such repeating units in a rate of not less than ½ and preferably ⅔ of the main chain and may partially comprise other repeating units.

Now the hardened product produced from the foregoing polymer of the present invention will be detailed below.

The hardened product of the present invention is produced by heat-treating a poly(silyleneethynylene phenyleneethynylene) comprising repeating units represented by the structural formula (1B) at a temperature ranging from 50° to 700° C. The weight-average molecular weights of these poly(silyleneethynylene phenyleneethynylenes) are not restricted to a specific range, but preferably range from 500 to 1,000,000. Particularly preferred are those obtained by heat-treating the poly(silyleneethynylene phenyleneethynylene s) comprising the repeating units represented by the structural formula (2) at a temperature ranging from 50° to 700° C. because of their high heat resistance.

These hardened products can specifically be prepared in the following manner.

The hardened products of the present invention are produced by heat-treating the poly(silyleneethynylene phenyleneethynylenes) comprising the repeating units represented by the structural formula (1B) in a gas atmosphere comprising air, nitrogen or an inert gas. The poly(silyleneethynylene phenyleneethynylenes) herein used mainly comprise the repeating units represented by the structural formula (1B) in a ratio of not less than ½ of the main chain. It is preferred to simply use the poly(- silyleneethynylene phenyleneethynylenes) comprising the repeating units represented by the structural formula (1B) from the practical standpoint, but may be used in combination with other various polymers.

The poly(silyleneethynylene phenyleneethynylenes) comprising the repeating units represented by the structural formula (1B) are not limited to those prepared by a specific method and may be those prepared by the method of the present invention, i.e., through the reaction of organic magnesium reagents represented by the structural formula (3) with dichlorosilanes represented by the structural formula (4) according to the reaction scheme (7) or those prepared through dehydration polycondensation reactions of hydrosilanes with diethynyl compounds in the presence of basic metal oxides in accordance with the following reaction scheme (51):

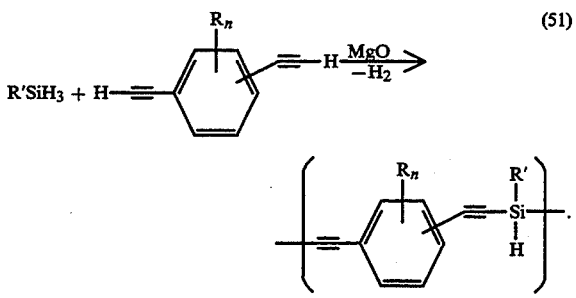

The basic metal oxides used in the reactions are roughly divided into basic metal oxides each comprising a single metal element and mixed oxides thereof. Specific examples of basic metal oxides usable herein include alkali metal oxides such as $Li_2O$, $Na_2O$, $K_2O$, $Rb_2O$ and $Cs_2O$; alkaline earth metal oxides such as BeO, MgO, CaO, SrO, BaO and RaO; lanthanoid oxides such as $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$; scandium oxide, yttrium oxide, thorium oxide, titanium oxide, zirconium oxide, hafnium oxide, copper oxide, zinc oxide and cadmium oxide.

Specific examples of mixed oxides comprising basic oxides are mixed oxides with silica such as $Li_2O$—$SiO_2$, $Na_2O$—$SiO_2$, $K_2O$—$SiO_2$, $Rb_2O$—$SiO_2$, $Cs_2O$—$SiO_2$, BeO—$SiO_2$, MgO—$SiO_2$, CaO—$SiO_2$, SrO—$SiO_2$, BaO—$SiO_2$, RaO—$SiO_2$, $La_2O_3$—$SiO_2$, $Sc_2O_3$—$SiO_2$, $Y_2O_3$—$SiO_2$, $Th_2O$—$SiO_2$ and ZnO—$SiO_2$; mixed oxides with alumina such as $Li_2O$—$Al_2O_3$, $Na_2O$—$Al_2O_3$, $K_2O$—$Al_2O_3$, $Rb_2O$—$Al_2O_3$, $Cs_2O$—$Al_2O_3$, BeO—$Al_2O_3$, MgO—$Al_2O_3$, CaO—$Al_2O_3$, SrO—$Al_2O_3$, BaO—$Al_2O_3$, $TiO_2$—$Al_2O_3$, RaO—$Al_2O_3$, $La_2O_3$—$Al_2O_3$, $Sc_2O_3$—$Al_2O_3$, $Y_2O_3$—$Al_2O_3$, $Th_2O$—$Al_2O_3$, $Zr_2O$—$Al_2O_3$ and ZnO—$Al_2O_3$.

Examples of mixed oxides with magnesia include $Li_2O$—MgO, $Na_2O$—MgO, $K_2O$—MgO, $Rb_2O$—MgO, $Cs_2O$—MgO, BeO—MgO, CaO—MgO, SrO—MgO, BaO—MgO, RaO—MgO, $La_2O_3$—MgO, $Sc_2O_3$—MgO, $Y_2O_3$—MgO, $Th_2O$—MgO, $TiO_2$—MgO, $Zr_2O$—MgO and ZnO—MgO. Examples of mixed oxides with silica-alumina include $Li_2O$—$SiO_2$—$Al_2O_3$, $Na_2O$—$SiO_2$—$Al_2O_3$, $K_2O$—$SiO_2$—$Al_2O_3$, $Rb_2O$—$SiO_2$—$Al_2O_3$, $Cs_2O$—$SiO_2$—$Al_2O_3$, BeO—$SiO_2$—$Al_2O_3$, MgO—$SiO_2$—$Al_2O_3$, CaO—$SiO_2$—$Al_2O_3$, SrO—$SiO_2$—$Al_2O_3$, BaO—$SiO_2$—$Al_2O_3$, RaO—$SiO_2$—$Al_2O_3$, $La_2O_3$—$SiO_2$—$Al_2O_3$, $Sc_2O_3$—$SiO_2$—$Al_2O_3$, $Y_2O_3$—$SiO_2Al_2O_3$, $Th_2O$—$SiO_2$—$Al_2O_3$, $Zr_2O$—$SiO_2Al_2O_3$ and ZnO—$SiO_2$—$Al_2O_3$. Examples of mixed oxides with silica-magnesia include $Li_2O$—$SiO_2$—MgO, $Na_2O$—$SiO_2$—MgO, $K_2O$—$SiO_2$—MgO, $Rb_2O$—$SiO_2$—MgO, $Cs_2O$—$SiO_2$—MgO, BeO—$SiO_2$—MgO, CaO—$SiO_2$—MgO, SrO—$SiO_2$—MgO, BaO—$SiO_2$—MgO, RaO—$SiO_2$—MgO, $La_2O_3$—$SiO_2$—MgO, $Sc_2O_3$—$SiO_2$—MgO, $Y_2O_3$—$SiO_2$—MgO, $Th_2O$—$SiO_2$—MgO, $Zr_2O$—$SiO_2MgO$ and ZnO—$SiO_2$—MgO.

Moreover, examples of mixed oxides with magnesia-alumina include $Li_2O$—MgO—$Al_2O_3$, $Na_2O$—MgO—$Al_2O_3$, $K_2O$—MgO—$Al_2O_3$, $Rb_2O$—MgO—$Al_2O_3$, $Cs_2O$—MgO—$Al_2O_3$, BeO—MgO—$Al_2O_3$, CaO—MgO—$Al_2O_3$, SrO—MgO—$Al_2O_3$, BaO—MgO—$Al_2O_3$, RaO—MgO—$Al_2O_3$, $La_2O_3$—MgO—$Al_2O_3$, $Sc_2O_3$—MgO—$Al_2O_3$, $Y_2O_3$—MgO—$Al_2O_3$, $Th_2O$—MgO—$Al_2O_3$, $Zr_2O$—MgO—$Al_2O_3$ and ZnO—MgO—$Al_2O_3$.

These metal oxides are in general subjected to activation-treatment prior to use. For instance, they are heat-treated at a temperature ranging from 100° to 800° C. for preferably 1 to 5 hours in a gas atmosphere comprising air or nitrogen or an inert gas such as argon or helium or under reduced pressure, prior to practical use. The desired metal oxide can also be prepared through thermal-decomposition of, for instance, nitrates, carbonates, oxalates or hydroxides of corresponding metals under the conditions described above.

The hardened product of the present invention can be produced by melting the poly(silyleneethynylene phenyleneethynylenes) or dissolving the polymers in a proper solvent, then formed into various shapes (such as molded bodies, films and fibers) and heating in an gas atmosphere of air, nitrogen or an inert gas such as argon or helium. The heating temperature in general ranges from 50° to 700° C., preferably 100° to 400° C. and more preferably 150° to 350° C. The heating time is not critical, but in general ranges from one minute to 100 hours. The heating temperature and time vary depending on the kinds, forms or shapes of silicon-containing polymers as well as applications of the resulting hardened products. The hardening reaction can generally be performed by simply heating the polymer, but may optionally performed in the coexistance of hardening agents such as hexamethyleneteramine, diamines and acid anhydrides; and/or radical initiators such as benzoyl peroxide, cumene hydroperoxide, di-t-butyl peroxide, t-butyl peroxybenzoate, hydrogen peroxide, potassium persulfate, azobisisobutyronitrile and diazoaminoazobenzene. Moreover, the silicon-containing polymers may comprise other various polymeric compounds such as polyimides, polyamides, phenol resins, epoxy resins, poly(ether ester ketones), polysulfones and poly(oxadiazoles).

The hardened product of the present invention is used as various highly heat-resistant materials such as highly heat-resistant and high strength fiber and the like.

The present invention will hereunder be explained in more detail with reference to the following non-limitative working Examples and the effects practically accomplished by the present invention are also discussed in detail below.

EXAMPLE 1

Preparation of Poly(silyleneethynylene-1,4-phenyleneethynylene)

First of all, an organic magnesium reagent was prepared as follows. Flaky magnesium metal (1.21 g; 49.8 mmol) was introduced into a 300 ml volume 4-necked flask and the atmosphere in the flask was replaced with dry nitrogen gas. THF (20 ml) which had been dried with lithium aluminum hydride and then subjected to simple distillation was introduced into the flask, a small piece of iodine was added thereto and the mixture was stirred to activate magnesium. To the activated magnesium, there was dropwise added a solution of 4.91 g (45.1 mmol) of ethyl bromide in THF (20 ml) at room temperature over about 20 minutes and the mixture was reacted while refluxing with heating over 2 hours to give ethylmagnesium bromide. To the reaction system, there was dropwise added a solution of 2.77 g (22.0 mmol) of p-diethynylbenzene in THF (30 ml) at room temperature over 20 minutes with stirring and the reaction was continued for additional one hour while refluxing with heating to give an intended organic magnesium reagent (22.0 mmol).

Then a polymer was prepared in the following manner. The reaction was performed subsequent to the foregoing preparation of the organic magnesium reagent. The contents of the flask containing the organic magnesium reagent were bubbled with dichlorosilane (2.22 g; 22.0 mmol) at room temperature over 20 minutes with stirring. White precipitates of the organic magnesium reagent disappeared immediately before the completion of the bubbling and the solution became almost clear. The reaction system was further reacted for one hour while refluxing with heating. Then the reaction system was post-treated. More specifically, 5.45 g (50 mmol) of trimethylsilyl chloride ($Me_3SiCl$) was added to the reaction solution and the mixture was refluxed with heating for additional one hour. The contents of the flask was cooled to room temperature. Another 500 ml volume flask was filled with 300 ml of a 0.5N aqueous solution of hydrochloric acid and ice-cooled. A dropping funnel was fitted to the 500 ml flask, the reaction solution in the 300 ml flask was transferred to the dropping funnel and the hydrochloric acid aqueous solution was gently stirred while slowly dropwise adding the reaction solution through the dropping funnel (over 30 minutes). The resulting oil phase was separated using a separatory funnel and dried by adding sodium sulfate and allowing to stand overnight. The solution was filtered through a glass filter to remove the dehydrating agent. The solvent was distilled off from the solution using an evaporator to give a viscous oily crude product. Dry n-hexane (50 ml) was added to the crude product and stirred. The intended polymer was insoluble in n-hexane and therefore, precipitated. The resulting precipitates were filtered off and dried to give 1.52 g (yield: 45%) of an intended polymer. The resulting polymer was a pale yellow solid and had weight-average and number-average molecular weights of 5,900 and 2,400 as determined by GPC.

Various properties of the resulting polymer were determined. The results are listed below.

(1) Elemental Analysis ($C_{10}H_6Si$): Found: C 77.81%; H 3.95%; Si 18.12% Calculated: C 77.87%; H 3.92%; Si 18.21%

(2) IR (Sample was a cast film formed on an Si wafer), $cm^{-1}$: 3294(w), 2957(w), 2926(w), 2189(m), 2166(s, Si—H), 1496(m), 1237(m), 1222(m), 934(m), 847(s, Si—H), 824(m), 620(m) (FIG. 1)

(3) $^1$H-NMR (500 MHz, $CDCl_3$),δ(ppm): 7.49 (s, 4H, hydrogen atoms of phenylene group), 4.57 (s, 2H, Si—H)

(4) $^{13}$C-NMR (500 MHz, $CDCl_3$), δ(ppm): 132.1 and 122.9 (carbon atoms on benzene ring); 107.5 and 85.2 (carbon atoms of ethynylene group)

(5) $^{29}$Si-NMR (500 MHz, $CDCl_3$),δ(ppm): −84.0 (t, $J_{Si-}$=230 Hz). The $^{29}$Si-NMR signal is splitted into triplet according to the proton-non-decoupling measurement of $^{29}$Si-NMR and therefore, this signal can be ascribed to silylene group (—Si(H)$_2$—).

Example 2

Preparation of Poly(methylsilyleneethynylene-1,4-phenyleneethynylene)

First of all, an organic magnesium reagent was prepared as follows. Flaky magnesium metal (1.21 g; 49.8 mmol) was introduced into a 200 ml volume 4-necked flask and the atmosphere in the flask was replaced with dry nitrogen gas. THF (20 ml) which had been dried with lithium aluminum hydride and then subjected to simple distillation was introduced into the flask, a small piece of iodine was added thereto and the mixture was stirred to activate magnesium. To the activated magnesium, there was dropwise added a solution of 5.25 g (48.2 mmol) of ethyl bromide in THF (20 ml) at room temperature over about 20 minutes and the mixture was reacted while refluxing with heating over 2 hours to give ethylmagnesium bromide. To the reaction system, there was dropwise added a solution of 3.03 g (24.0 mmol) of p-diethynylbenzene in THF (20 ml) at room temperature over 20 minutes with stirring and the reaction was continued for additional 1.5 hour while refluxing with heating to give an intended organic magnesium reagent (24.0 mmol).

Then a polymer was prepared in the following manner. The reaction was performed subsequent to the foregoing preparation of the organic magnesium reagent. A solution of 2.76 g (23.8 mmol) of dichloromethylsilane in 20 ml of THF was dropwise added to the flask containing the organic magnesium reagent at room temperature over 30 minutes with stirring and the reaction was continued for additional 2 hours while refluxing with heating. Then the reaction system was post-treated. More specifically, the contents of the flask were ice-cooled and 1 ml of methanol was slowly and dropwise added to the reaction solution in such a manner that the solution was maintained at a temperature of not more than 10° C. with stirring. After the dropwise addition, the reaction solution was stirred for additional 30 minutes while returning the temperature of the solution back to room temperature. The flask was again ice-cooled and the solution was hydrolyzed by adding about 50 ml of a saturated ammonium chloride aqueous solution. The resulting oil phase was separated using a separatory funnel and dried by adding sodium sulfate and allowing to stand overnight. The solution was filtered through a glass filter to remove the dehydrating agent. The solvent was distilled off from the solution using an evaporator to give a viscous oily crude product. The crude product was dissolved in 25 ml of THF and dispersed in methanol to precipitate the product. The resulting precipitates were filtered off and dried to give 2.76 g (yield: 68%) of an intended polymer. The resulting polymer was a pale yellow solid and had weight-average and number-average molecular weights of 28,000 and 6,300 as determined by GPC.

Various properties of the resulting polymer were measured. The results are listed below.

(1) Elemental Analysis ($C_{11}H_8Si$): Found: C 78.12%; H 4.74%; Si 16.59% Calculated: C 78.52%; H 4.79%; Si 16.69%

Figure 2:
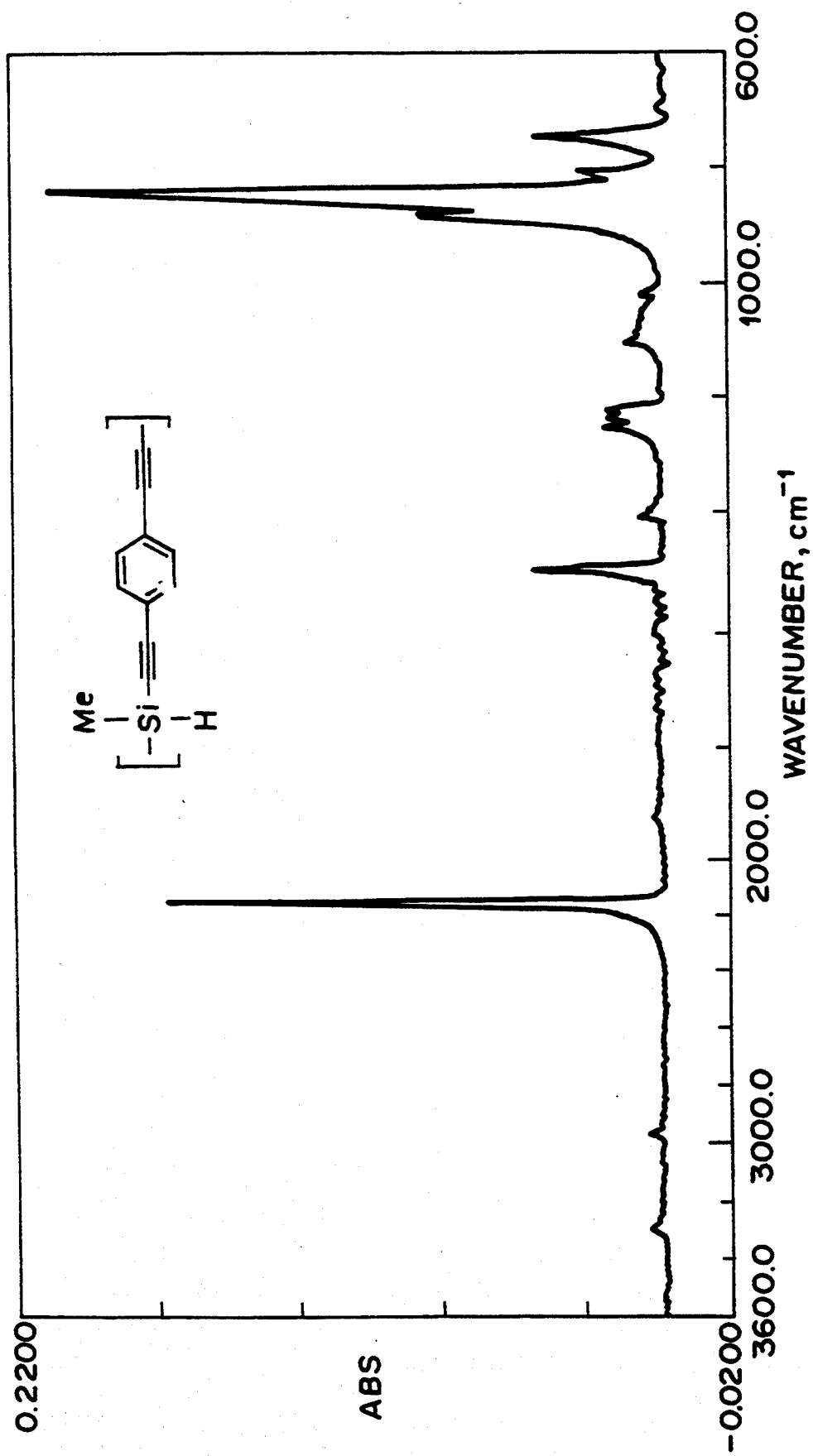
FIG. 2 is a chart showing infrared spectra of the polymer prepared in Example 2.

(2) IR (Sample was a cast film formed on an Si wafer), $cm^{-1}$: 3297(w), 2970(w), 2164(s, Si—H), 1497(m), 1254(m), 223(m), 1103(m), 880(m), 839 (s, Si—H), 806(m), 41(m) (FIG. 2)

(3) $^1$H-NMR (500 MHz, $CDCl_3$),δ(ppm): 7.47 (s, 4H, hydrogen atoms of phenylene group), 4.62 (q, 1H, Si—H), 0.54 (d, 3H, $CH_3$)

(4) $^{13}$C-NMR (500 MHz, $CDCl_3$), δ(ppm): 132.0 and 123.0 (carbon atoms on benzene ring); 106.4 and 89.5 (carbon atoms of ethynylene group), −2.7 (carbon atom of methyl group)

Figure 3:
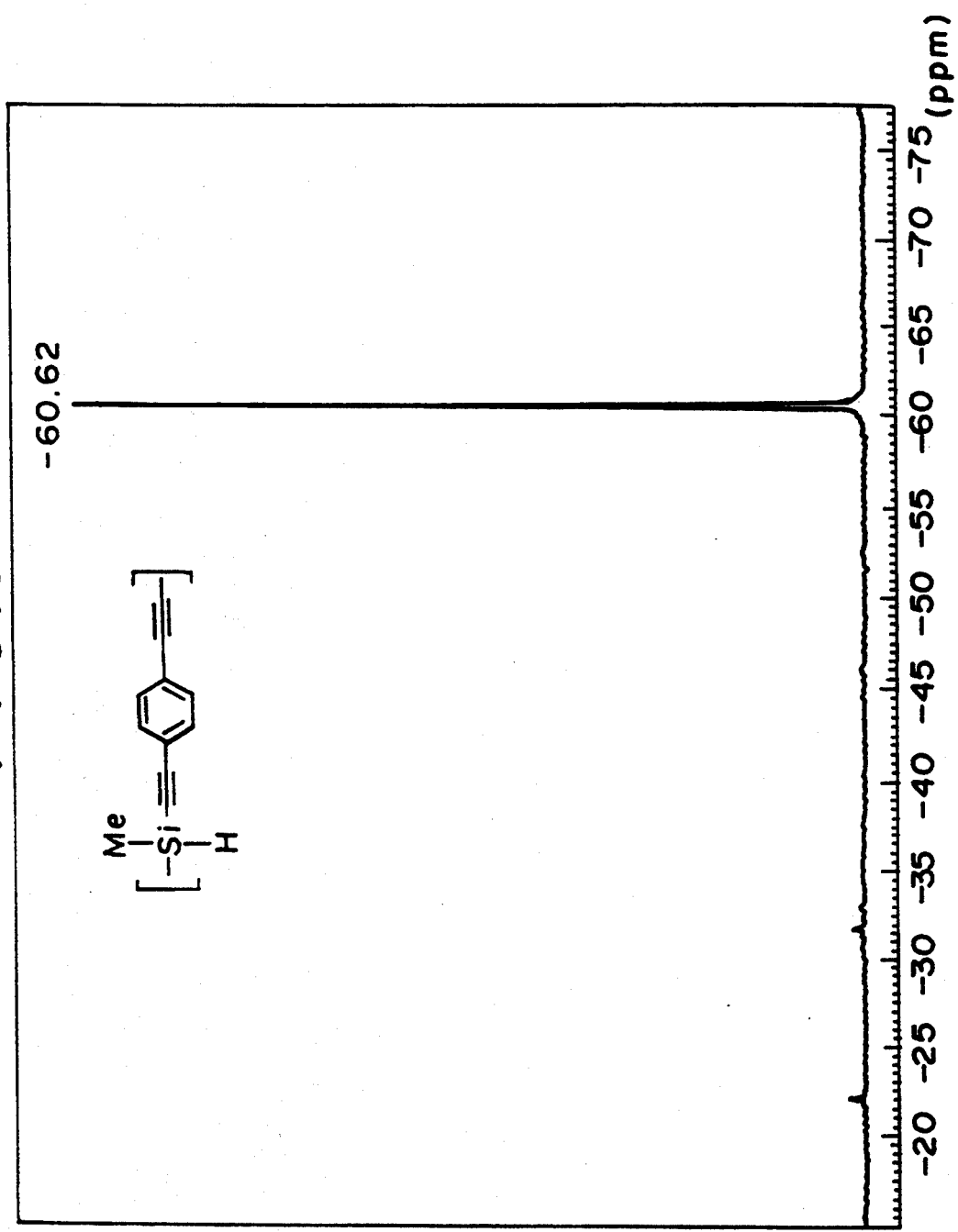
FIG. 3 is a chart showing $^{29}$Si-NMR spectra of the polymer prepared in Example 2.

(5) $^{29}$Si-NMR (500 MHz, $CDCl_3$),δ(ppm): −60.6, determined according to the proton-decoupling method (non-NOE Mode). The $^{29}$Si-NMR spectrum of di(phenylethynyl)methylsilane (($PhC\equiv C)_2MeSiH$) as the model compound is −60.6 ppm and thus the spectrum can be ascribed to the silicon atom in the main chain of the resulting polymer (FIG. 3).

EXAMPLE 3

Preparation of Poly(phenylsilyleneethynylene-1,4-phenyleneethynylene)

First of all, an organic magnesium reagent was prepared as follows. Flaky magnesium metal (1.22 g; 50.2 mmol) was introduced into a 200 ml volume 4-necked flask and the atmosphere in the flask was replaced with dry nitrogen gas. THF (20 ml) which had been dried with lithium aluminum hydride and then subjected to simple distillation was introduced into the flask, a small piece of iodine was added thereto and the mixture was stirred to activate magnesium. To the activated magnesium, there was dropwise added a solution of 4.95 g (45.4 mmol) of ethyl bromide in THF (20 ml) at room temperature over about 20 minutes and the mixture was reacted while refluxing with heating over 2 hours to give ethylmagnesium bromide. To the reaction system, there was dropwise added a solution of 2.69 g (21.3 mmol) of p-diethynylbenzene in THF (20 ml) at room temperature over 20 minutes with stirring and the reaction was continued for additional one hour while refluxing with heating to give an intended organic magnesium reagent (21.3 mmol).

Then a polymer was prepared in the following manner. The reaction was performed subsequent to the foregoing preparation of the organic magnesium reagent. A solution of dichlorophenylsilane (3.81 g; 21.5 mmol) in THF (20 ml) was dropwise added to the flask containing the organic magnesium reagent at room temperature over 25 minutes with stirring and the reaction was continued for additional 2 hours while refluxing with heating. Then the reaction system was post-treated. More specifically, the contents of the flask were ice-cooled and 1 ml of methanol was slowly and dropwise added to the reaction solution in such a manner that the solution was maintained at a temperature of not more than 10° C. with stirring. After the dropwise addition, the reaction solution was stirred for additional 40 minutes while returning the temperature of the solution back to room temperature. The flask was again ice-cooled and the solution was hydrolyzed by adding about 50 ml of a saturated ammonium chloride aqueous solution. The resulting oil phase was separated using a separatory funnel and dried by adding sodium sulfate and allowing to stand overnight. The solution was filtered through a glass filter to remove the dehydrating agent. The solvent was distilled off from the solution using an evaporator to give a viscous oily crude product. The crude product was dissolved in 40 ml of THF, then dispersed in methanol to precipitate the product. The resulting precipitates were filtered off and dried to give 3.59 g (yield: 73%) of an intended polymer. The resulting polymer was a pale yellow solid and had weight-average and number-average molecular weights of 33,000 and 4,900 as determined by GPC.

Various properties of the resulting polymer were determined. The results are listed below.

(1) Elemental Analysis ($C_{16}H_{10}Si$): Found: C 83.02%; H 4.40%; Si 12.08% Calculated: C 83.43%; H 4.38%; Si 12.19%

Figure 4:
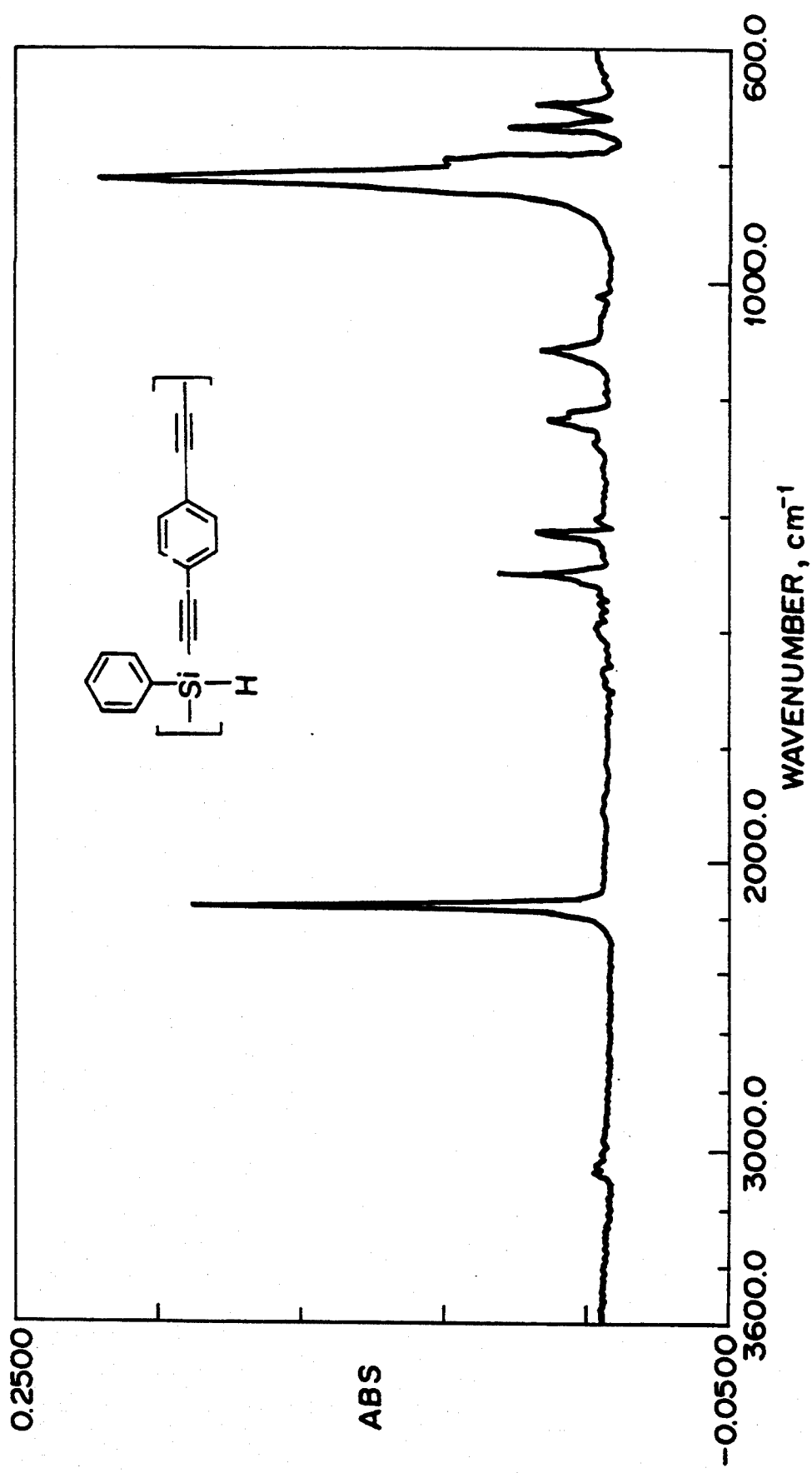
FIG. 4 is a chart showing infrared spectra of the polymer prepared in Example 3.

(2) IR (Sample was a cast film formed on an Si wafer), $cm^{-1}$: 3071–2962(w), 2163(s, Si—H), 1497(m), 1430(m), 1237(m), 1117(m), 822(s, Si—H), 756(m), 697(m) (FIG. 4)

(3) $^1$H-NMR (500 MHz, $CDCl_3$), δ(ppm): 7.80–7.45 (m, 9H, hydrogen atoms of benzene ring), 5.12 (s, 1H, Si—H)

(4) $^1$C-NMR (500 MHz, $CDCl_3$), δ(ppm): 134.8, 130.7, 129.9 and 128.3 (carbon atoms of phenyl group); 132.1 and 123.0 (carbon atoms of phenylene group); 107.7 and 88.0 (carbon atoms of ethynylene group)

Figure 5:
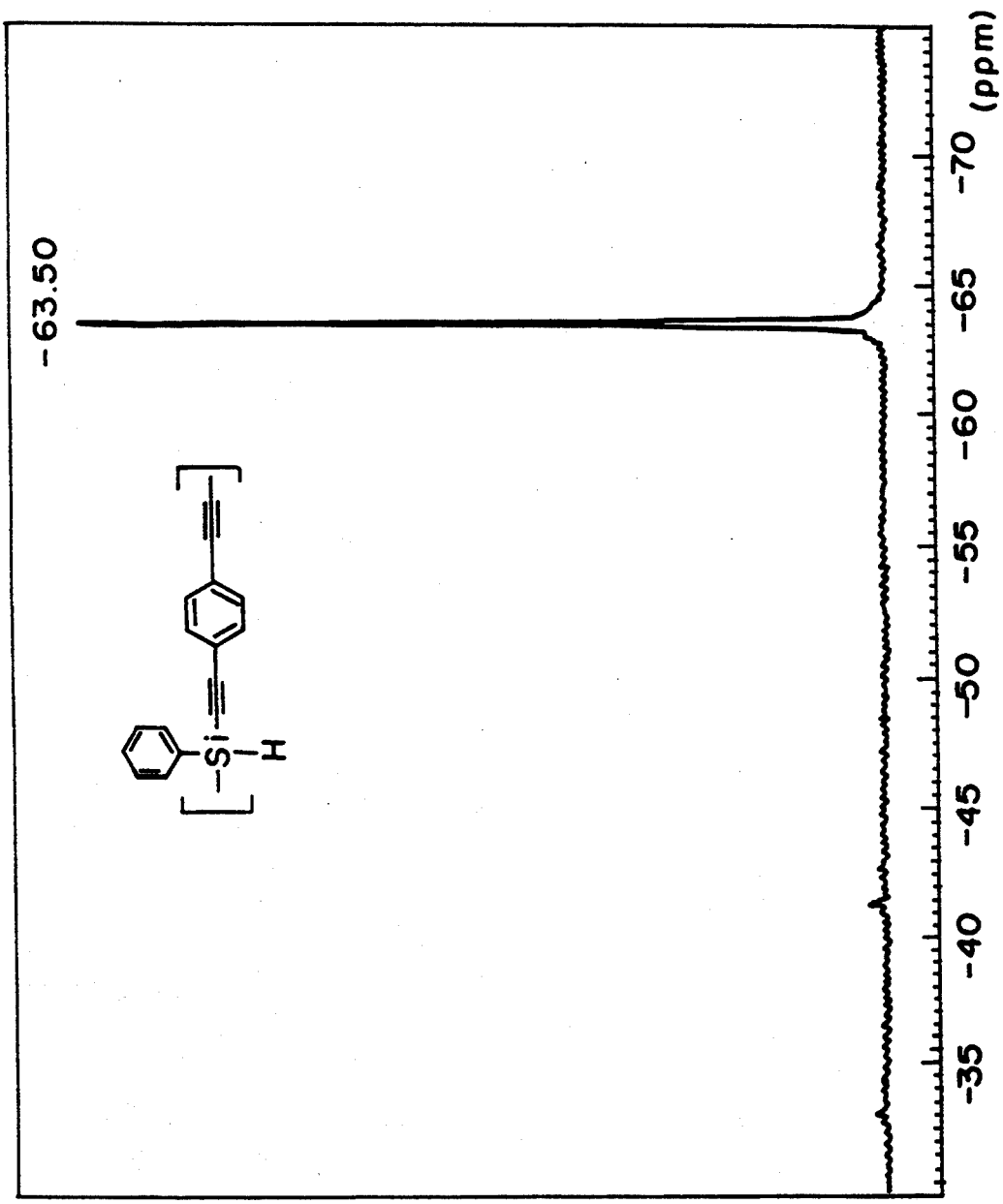
FIG. 5 is a chart showing $^{29}$Si-NMR spectra of the polymer prepared in Example 3.

(5) $^{29}$Si-NMR (500 MHz, $CDCl_3$), δ(ppm): −63.5, determined according to the proton-decoupling method (non-NOE Mode). The $^{29}$Si-NMR spectrum of di(phenylethynyl)phenylsilane (($PhC\equiv C)_2PhSiH$) as the model compound is −63.6 ppm and thus the spectrum can be ascribed to the silicon atoms in the main chain of the resulting polymer (FIG. 5).

Example 4

Preparation of Poly(silyleneethynylene-1,3-phenyleneethynylene)

First of all, an organic magnesium reagent was prepared as follows. Flaky magnesium metal (1.22 g; 50.2 mmol) was introduced into a 300 ml volume 4-necked flask and the atmosphere in the flask was replaced with dry nitrogen gas. THF (20 ml) which had been dried with lithium aluminum hydride and then subjected to simple distillation was introduced into the flask, a small piece of iodine was added thereto and the mixture was stirred to activate magnesium. To the activated magnesium, there was dropwise added a solution of 4.91 g (45.1 mmol) of ethyl bromide in THF (20 ml) at room temperature over about 20 minutes and the mixture was reacted while refluxing with heating over 2 hours to give ethylmagnesium bromide. To the reaction system, there was dropwise added a solution of 2.78 g (22.0 mmol) of m-diethynylbenzene in THF (30 ml) at room temperature over 20 minutes with stirring and the reaction was continued for one hour while refluxing with heating to give an intended organic magnesium reagent (22.0 mmol).

Then a polymer was prepared in the following manner. The reaction was performed subsequent to the foregoing preparation of the organic magnesium reagent. The contents of the flask containing the organic magnesium reagent were bubbled with dichlorosilane (2.18 g; 21.6 mmol) at room temperature over 20 minutes with stirring. White precipitates of the organic magnesium reagent disappeared immediately before the completion of the bubbling and the solution became almost clear. The reaction system was further reacted for one hour while refluxing with heating. Then the reaction system was post-treated. More specifically, 0.67 g (6.2 mmol) of trimethylsilyl chloride (Me$_3$SiCl) was added to the reaction solution and the mixture was refluxed with heating for additional one hour. The contents of the flask was cooled to room temperature. Another 500 ml volume flask was filled with 200 ml of a 0.1N aqueous solution of hydrochloric acid and ice-cooled. A dropping funnel was fitted to the 500 ml flask, the reaction solution in the 300 ml flask was transferred to the dropping funnel and the hydrochloric acid aqueous solution was gently stirred while slowly dropwise adding the reaction solution through the dropping funnel (over 30 minutes). The resulting oil phase was separated using a separatory funnel and dried by adding sodium sulfate and allowing to stand overnight. The solution was filtered through a glass filter to remove the dehydrating agent. The solvent was distilled off from the solution using an evaporator to give a viscous oily crude product. The crude product was dissolved in 40 ml of THF, dispersed in methanol to precipitate the product. The resulting precipitates were filtered off and dried to give 1.15 g (yield: 34%) of an intended polymer. The resulting polymer was a pale yellow solid and had weight-average and number-average molecular weights of 9,800 and 3,100 as determined by GPC.

Various properties of the resulting polymer were determined. The results are listed below.

(1) Elemental Analysis ($C_{10}H_6Si$): Found: C 77.91%; H 3.96%; Si 18.10% Calculated: C 77.87%; H 3.92%; Si 18.21%

Figure 6:
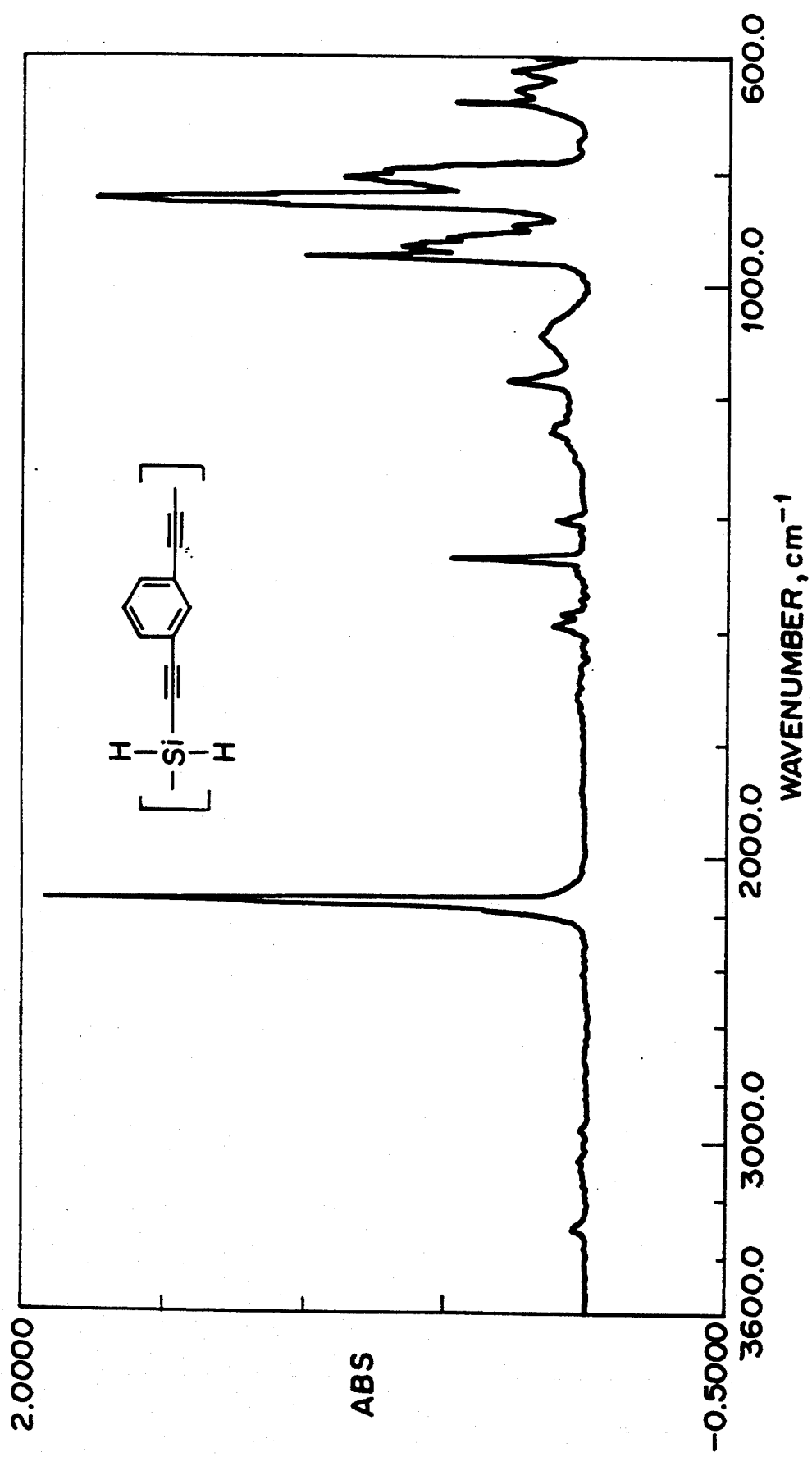
FIG. 6 is a chart showing infrared spectra of the polymer prepared in Example 4.

(2) IR (Sample was a cast film formed on an Si wafer), cm$^{-1}$: 3299(w), 3065(w), 2963(w), 2160(s, Si—H), 1593(m), 1476(m), 1262(m), 1169(m), 952(m), 933(m), 919(m), 850(s, Si—H), 811(m), 683(m), 619(m) (FIG. 6)

(3) $^1$H—NMR (500 MHz, CDCl$_3$),δ(ppm): 7.68 (s, 1H), 7.48 (d, 2H) and 7.28 (d, 1H) (hydrogen atoms of benzene ring); 4.55 (s, 2H) (hydrogen atoms of Si—H)

(4) $^{13}$C-NMR (500 MHz, CDCl$_3$), δ(ppm): 135.8, 132.9, 128.5 and 122.4 (carbon atoms on benzene ring); 107.0 and 83.8 (carbon atoms of ethynylene group)

(5) $^{29}$Si-NMR (500 MHz, CDCl$_3$),δ(ppm): −83.9 (t, $J_{Si-H}$=234 Hz). The $^{29}$Si-NMR signal is splitted into triplet according to the proton-non-decoupling measurement of $^{29}$Si-NMR and therefore, this signal can be ascribed to silylene group (—Si(H)$_2$—).

EXAMPLE 5

Preparation of Poly(methylsilyleneethynylene-1,3-phenyleneethynylene)

First of all, an organic magnesium reagent was prepared as follows. Flaky magnesium metal (1.22 g; 50.2 mmol) was introduced into a 200 ml volume 4-necked flask and the atmosphere in the flask was replaced with dry nitrogen gas. THF (20 ml) which had been dried with lithium aluminum hydride and then subjected to simple distillation was introduced into the flask, a small piece of iodine was added thereto and the mixture was stirred to activate magnesium. To the activated magnesium, there was dropwise added a solution of 5.26 g (48.3 mmol) of ethyl bromide in THF (20 ml) at room temperature over about 25 minutes and the mixture was reacted while refluxing with heating over one hour to give ethylmagnesium bromide. To the reaction system, there was dropwise added a solution of 3.03 g (24.0 mmol) of m-diethynylbenzene in THF (20 ml) at room temperature over 20 minutes with stirring and the reaction was continued for additional one hour while refluxing with heating to give an intended organic magnesium reagent (24.0 mmol).

Then a polymer was prepared in the following manner. The reaction was performed subsequent to the foregoing preparation of the organic magnesium reagent. A solution of 2.76 g (23.8 mmol) of dichloromethylsilane in 20 ml of THF was dropwise added to the flask containing the organic magnesium reagent at room temperature over 20 minutes with stirring and the reaction was continued for additional one hour while refluxing with heating. Then the reaction system was post-treated. More specifically, the contents of the flask were first ice-cooled and 1 ml of methanol was slowly and dropwise added to the reaction solution in such a manner that the solution was maintained at a temperature of not more than 10° with stirring. After the dropwise addition, the reaction solution was stirred for additional 50 minutes while returning the temperature of the solution back to room temperature. The flask was again ice-cooled and the solution was hydrolyzed by adding about 50 ml of a saturated ammonium chloride aqueous solution. The resulting oil phase was separated using a separatory funnel and dried by adding sodium sulfate and allowing to stand overnight. The solution was filtered through a glass filter to remove the dehydrating agent. The solvent was distilled off from the solution using an evaporator to give a viscous oily crude product (yield of the crude product: 68%). The crude product was dissolved in 40 ml of THF and dispersed in methanol to precipitate the product. The resulting precipitates were filtered off and dried to give 1.82 g (yield: 45%) of an intended polymer. The resulting polymer was a pale yellow solid and had weight-average and number-average molecular weights of 17,400 and 7,300 as determined by GPC.

Various properties of the resulting polymer were subjected to analysis. The results are listed below.

(1) Elemental Analysis ($C_{11}H_8Si$): Found: C 78.12%; H 4.81%; Si 16.53% Calculated: C 78.52%; H 4.79%; Si 16.69%

Figure 7:
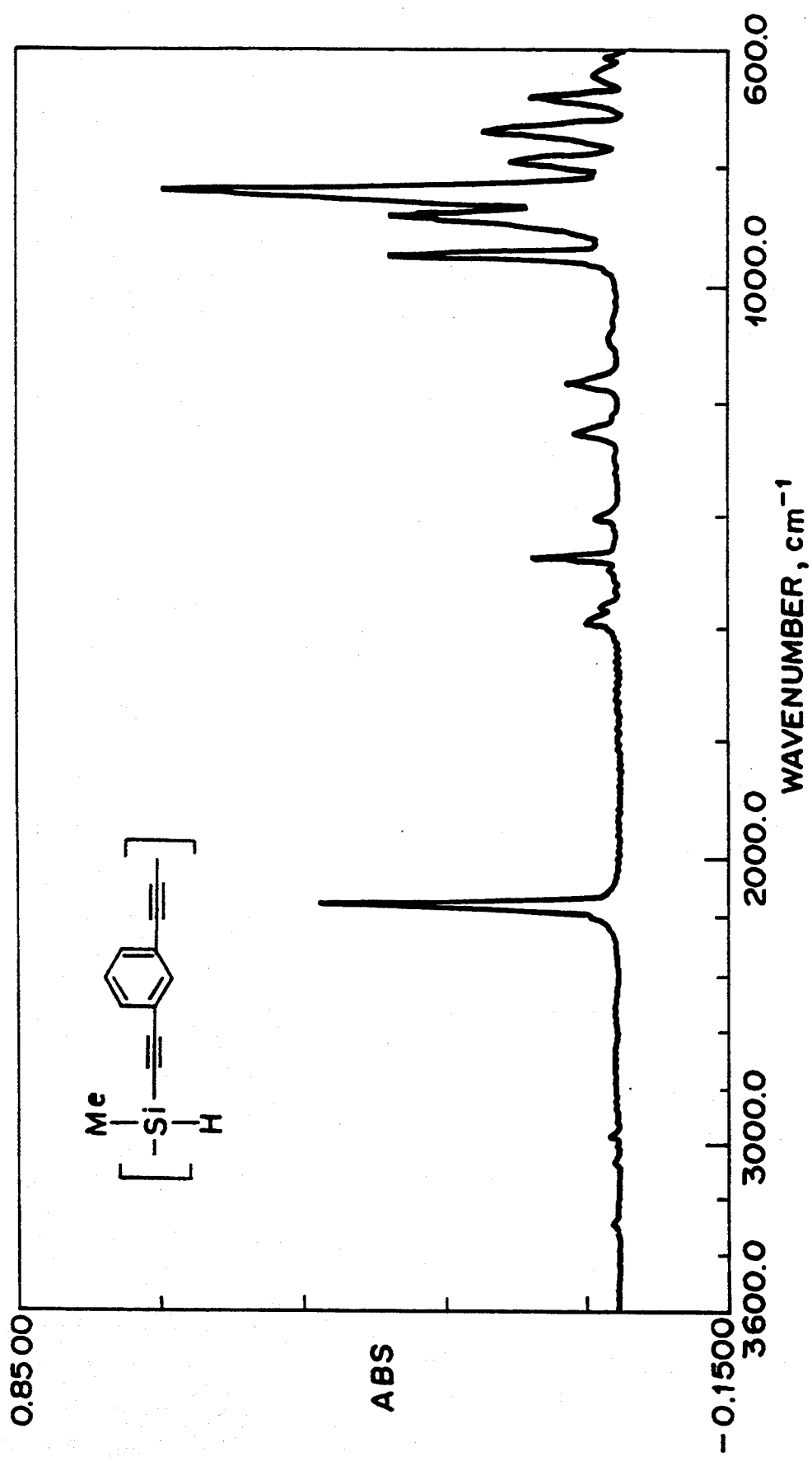
FIG. 7 is a chart showing infrared spectra of the polymer prepared in Example 5.

(2) IR (Sample was a cast film formed on an Si wafer), cm$^{-1}$: 3293(w), 3064(w), 2969(w), 2159(s, Si—H), 1592(m), 1476(m), 1254(m), 1167(m), 950(m), 881(m), 839 (s, Si—H), 793(m), 741(m), 684(m) (FIG. 7)

(3) $^1$H-NMR (500 MHz, CDCl$_3$),δ(ppm): 7.68 (s, 1H), 7.48 (d, 2H), 7.28 (d, 1H) (hydrogen atoms of benzene ring); 4.59 (d, 1H) (hydrogen atom of Si—H); 0.53 (d, 3H) (hydrogen atoms of methyl group)

(4) $^1$C-NMR (500 MHz, CDCl$_3$), δ(ppm): 135.7, 132.6, 128.4 and 122.7 (carbon atoms on benzene ring); 105.9 and 88.1 (carbon atoms of ethynylene group); −2.7 (carbon atom of methyl group)

Figure 8:
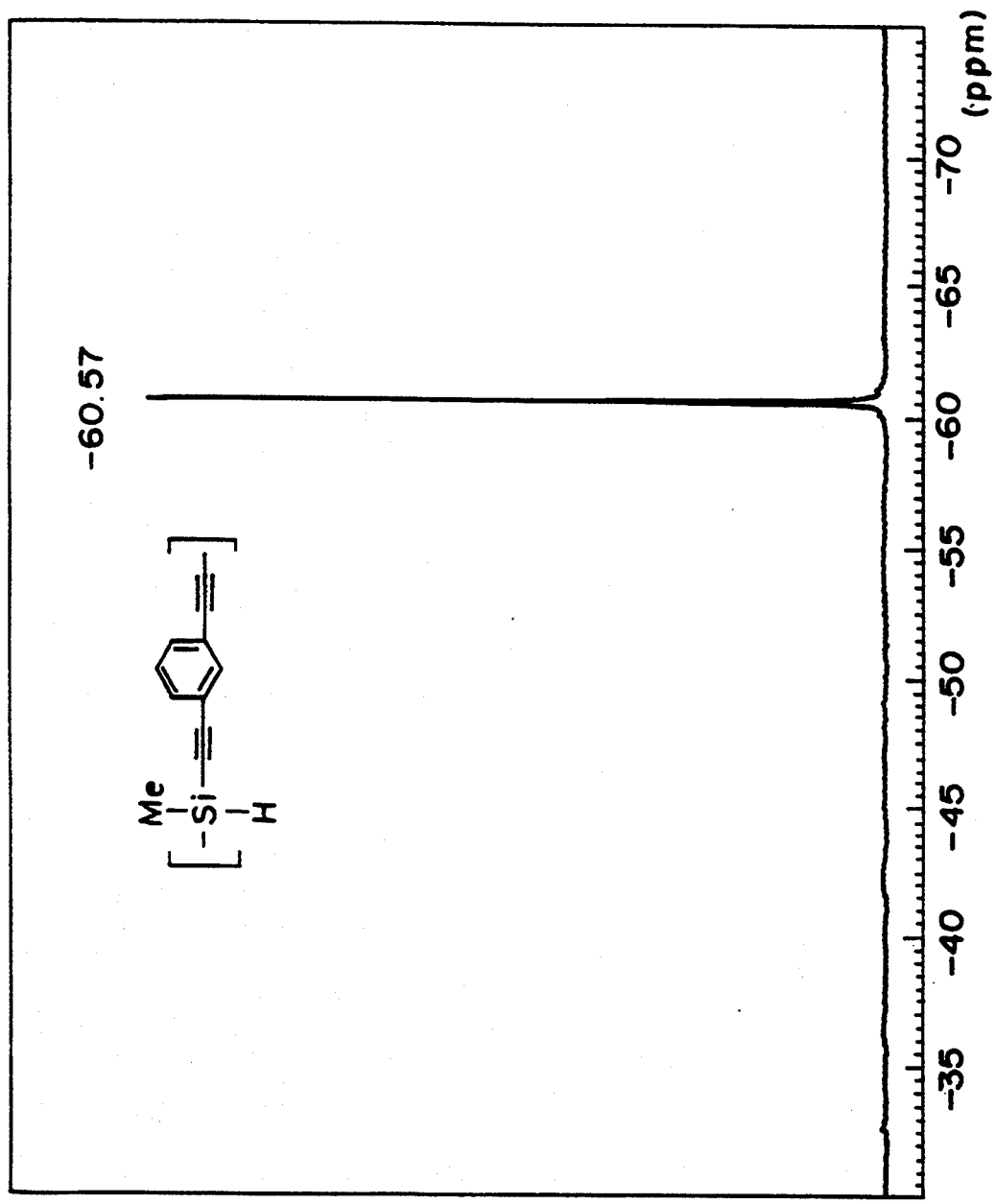
FIG. 8 is a chart showing $^{29}$Si-NMR spectra of the polymer prepared in Example 5.

(5) $^{29}$Si-NMR (500 MHz, CDCl$_3$), δ(ppm): −60.6, determined according to the proton-decoupling method (non-NOE Mode). The $^{29}$Si-NMR spectrum of di(-phenylethynyl)methylsilane as the model compound is −60.6 ppm and thus the spectrum can be ascribed to the silicon atoms in the main chain of the resulting polymer (FIG. 8).

EXAMPLE 6

Preparation of poly(phenylsilyleneethynylene-1,2-phenyleneethynylene)

First of all, an organic magnesium reagent was prepared as follows. Flaky magnesium metal (0.535 g; 22.0 mmol) was introduced into a 200 ml volume 4-necked flask and the atmosphere in the flask was replaced with dry nitrogen gas. THF (10 ml) which had been dried with lithium aluminum hydride and then subjected to simple distillation was introduced into the flask, a small piece of iodine was added thereto and the mixture was stirred to activate magnesium. To the activated magnesium, there was dropwise added a solution of 2.19 g (20.1 mmol) of ethyl bromide in THF (15 ml) at room temperature over about 15 minutes and the mixture was reacted while refluxing with heating over 2 hours to give ethylmagnesium bromide. To the reaction system, there was dropwise added a solution of 1.27 g (10.1 mmol) of o-diethynylbenzene in THF (10 ml) at room temperature over 20 minutes with stirring and the reaction was continued for additional one hour while refluxing with heating to give an intended organic magnesium reagent (10.1 mmol).

Then a polymer was prepared in the following manner. The reaction was performed subsequent to the foregoing preparation of the organic magnesium reagent. A solution of dichlorophenylsilane (1.77 g; 10.0 mmol) in THF (10 ml) was dropwise added to the flask containing the organic magnesium reagent at room temperature over 10 minutes with stirring and the reaction was continued for additional one hour while refluxing with heating. Then the reaction system was post-treated. More specifically, 2.17 g (20.0 mmol) of trimethylsilyl chloride ($Me_3SiCl$) was added to the reaction solution and the mixture was stirred for additional one hour while refluxing with stirring. The temperature of the flask was returned back to room temperature. Another 500 ml volume flask was filled with 150 ml of 0.5N hydrochloric acid aqueous solution and ice-cooled. A dropping funnel was fitted to the 500 ml flask, the reaction solution contained in the 200 ml flask was transferred to the dropping funnel and then the reaction solution in the dropping funnel was slowly and dropwise added to the hydrochloric acid aqueous solution with stirring over 30 minutes. Thus, solid matter was formed, but it was dissolved when 50 ml of benzene was added to the solution. The resulting oil phase was separated using a separatory funnel and dried by adding sodium sulfate and allowing to stand overnight. The solution was filtered through a glass filter to remove the dehydrating agent. The solvent was distilled off from the solution using an evaporator to give a viscous oily crude product (yield of the crude product: 98%). The crude product was dissolved in 20 ml of THF, then dispersed in methanol to precipitate the product. The resulting precipitates were filtered off and dried to give 1.01 g (yield: 44%) of an intended polymer. The resulting polymer was a pale yellow solid and had weight-average and number-average molecular weights of 3,200 and 1,700 as determined by GPC.

Various properties of the resulting polymer were determined. The results are listed below.

(1) Elemental Analysis ($C_{16}H_{10}Si$): Found: C 83.12%; H 4.48%; Si 12.02% Calculated: C 83.43%; H 4.38%; Si 12.19%

Figure 9:
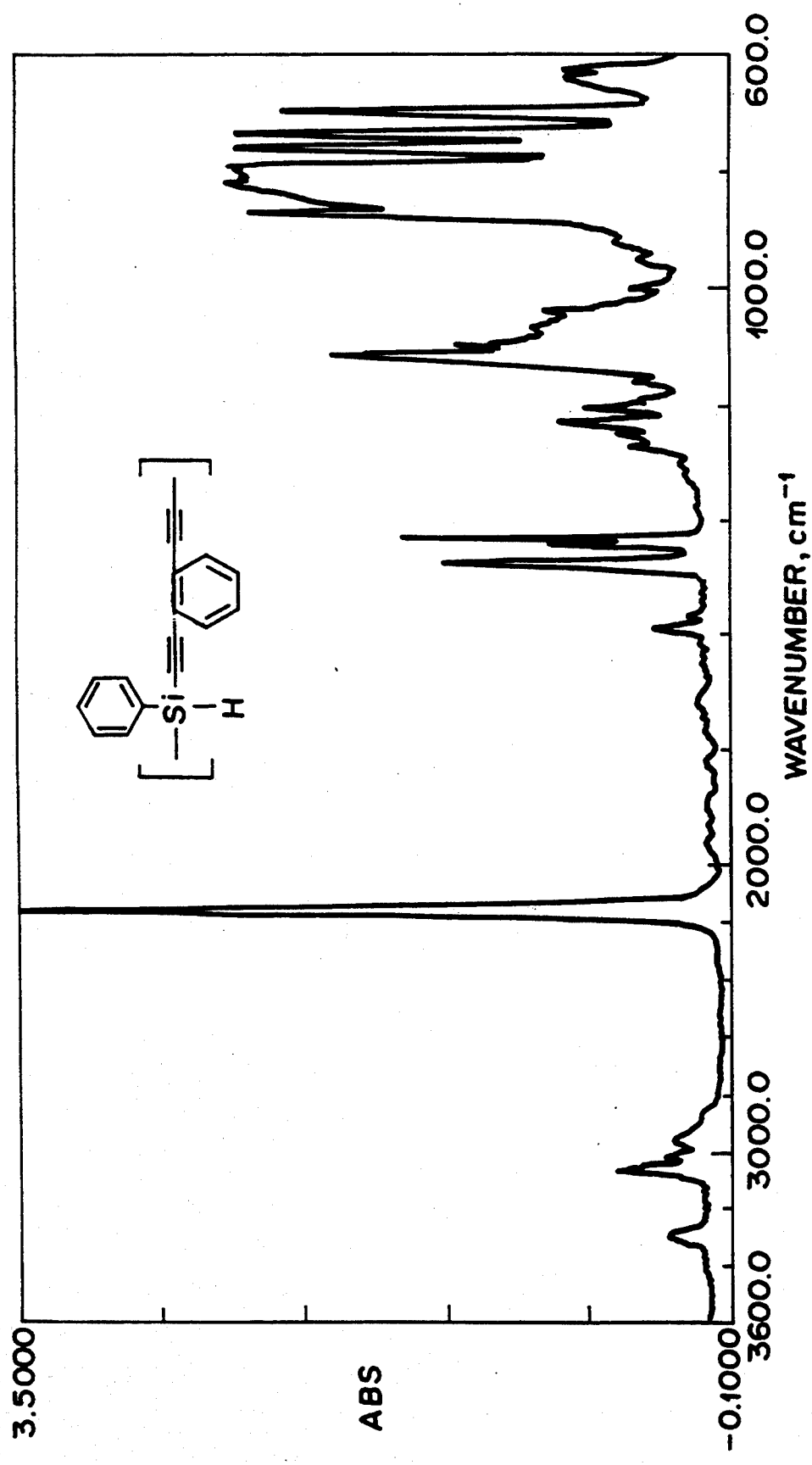
FIG. 9 is a chart showing infrared spectra of the polymer prepared in Example 6.

(2) IR (Sample was a cast film formed on an Si wafer), $cm^{-1}$: 3289(w), 3071–2962(w), 2170(s, Si—H), 1475(m), 1430(m), 1115(m), 871(M), 820(s, Si—H), 759(m), 736(m), 699(m) (FIG. 9)

(3) $^1$H-NMR (500 MHz, $CDCl_3$),δ(ppm): 7.87–7.20 (m, 9H, hydrogen atoms of benzene ring), 5.15 (s, 1H, Si—H)

(4) $^{13}$C-NMR (500 MHz, $CDCl_3$), δ(ppm): 134.9, 130.4, 129.7 and 128.3 (carbon atoms of phenyl group); 132.7, 128.8 and 125.3 (carbon atoms of phenylene group); 106.3 and 90.4 (carbon atoms of ethynylene group)

Figure 10:
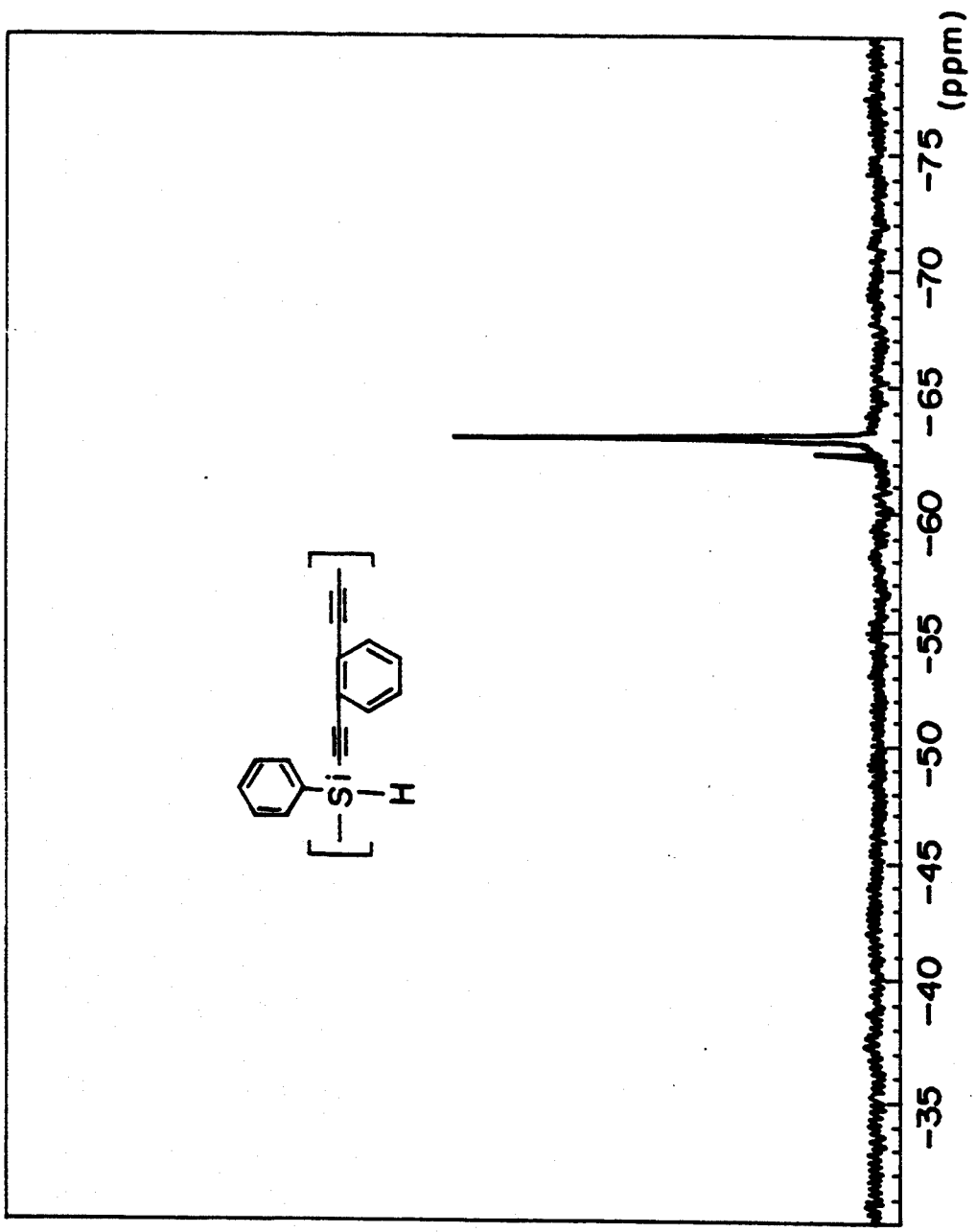
FIG. 10 is a chart showing $^{29}$Si-NMR spectra of the polymer prepared in Example 6.

(5) $^{29}$Si-NMR (500 MHz, $CDCl_3$),δ(ppm): −62.9, determined according to the proton-decoupling method (non-NOE Mode). The $^{29}$Si-NMR spectrum of di(-phenylethynyl)phenylsilane as the model compound is −63.6 ppm and thus the spectrum can be ascribed to the silicon atoms in the main chain of the resulting polymer (FIG. 10).

In Examples 1 to 6, a dibromide ($BrMgC\equiv CC_6H_4C\equiv CMgBr$) as the organic magnesium reagent, but the intended polymers can be prepared when a dichloride ($ClMgC\equiv CC_6H_4C\equiv CMgCl$) or a diiodide ($IMgC\equiv CC_6H_4C\equiv CMgI$) is substituted for the dibromide. An example thereof will be described below.

EXAMPLE 7

Preparation of Poly(silyleneethynylene-1,3-phenyleneethynylene)

The same procedures used in Example 4 were repeated except that a dichloride ($ClMgC\equiv CC_6H_4C\equiv CMgCl$) as the organic magnesium reagent was substituted for the dibromide ($BrMgC\equiv CC_6H_4C\equiv CMgBr$) used in Example 4 to give poly(silyleneethynylene phenyleneethynylene). The organic magnesium reagent was prepared in the same manner used for preparation of the dibromide except that 2-chloropropane was substituted for ethyl bromide. The resulting polymer was a pale yellow solid and had weight-average and number-average molecular weights of 8,500 and 2,500 as determined by GPC and the yield thereof was found to be 28%.

Various properties of the resulting polymer were determined. The results are listed below.

(1) Elemental Analysis ($C_{10}H_6Si$): Found: C 77.75%; H 3.98%; Si 18.06% Calculated: C 77.87%; H 3.92%; Si 18.21%.

The results of IR, $^1$H-NMR, $^{13}$C-NMR and $^{29}$Si-NMR measurements were identical to those observed in Example 4.

It was sometimes observed that the molecular weights and the yields of the resulting polymers vary depending on the kinds of the post-treatments. The post-treatments used were a method (Method 1) comprising dropwise adding the reaction solution to a saturated ammonium chloride aqueous solution; a method (Method 2) comprising dropwise adding the reaction solution to an aqueous solution of hydrochloric acid; a method (Method 3) comprising adding methanol to the reaction solution and then adding a saturated ammonium chloride aqueous solution to the resulting mixture; a method (Method 4) comprising adding methyl lithium to the reaction solution and then adding the reaction solution to an aqueous solution of hydrochloric acid; a method (Method 5) comprising adding monochlorosilane to the reaction solution and then dropwise adding a saturated ammonium chloride aqueous solution to the mixture; and a method (Method 6) comprising adding monochlorosilane to the reaction Solution and then adding the reaction solution to an aqueous solution of hydrochloric acid. As a result, it was found that Methods 5 and 6 could provide polymers in optimum yields. An example thereof will be described below. The post-treatment adopted in Example 3 was Method 3 (comprising adding methanol to the reaction solution and then adding a saturated ammonium chloride aqueous solution to the resulting mixture), but that adopted in the following Example 8 was Method 5 (comprising adding monochlorosilane to the reaction solution and then dropwise adding a saturated ammonium chloride aqueous solution to the mixture).

EXAMPLE 8

Preparation of poly(phenylsilyleneethynylene-1,4-phenyeneethynylene)

The same procedures used in Example 3 were repeated to give an organic magnesium reagent. A solution of 3.81 g (21.5 mmol) of dichlorophenylsilane in 20 ml of THF was dropwise added to the flask containing the organic magnesium reagent (21.5 mmol) at room temperature over 25 minutes with stirring and the reaction was continued for additional 2 hours while refluxing with heating. Then the reaction system was post-treated. More specifically, 2.17 g (20.0 mmol) of tri-methylsilyl chloride ($Me_3SiCl$) was added to the reaction solution and the resulting mixture was stirred for additional one hour under refluxing. The flask was ice-cooled and the solution was hydrolyzed by adding about 50 ml of a saturated ammonium chloride aqueous solution. The resulting oil phase was separated using a separatory funnel and dried by adding sodium sulfate and allowing to stand overnight. The solution was filtered through a glass filter to remove the dehydrating agent. The solvent was distilled off from the solution using an evaporator to give a viscous oily crude product. The crude product was dissolved in 40 ml of THF and dispersed in methanol to precipitate the product. The resulting precipitates were filtered off and dried to give 4.21 g (yield: 85%) of an intended polymer. The resulting polymer was a pale yellow solid and had weight-average and number-average molecular weights of 20,000 and 4,500 as determined by GPC.

Various properties of the resulting polymer were subjected to analysis. The results are listed below.

(1) Elemental Analysis ($C_{16}H_{10}Si$): Found: C 83.25%; H 4.48%; Si 12.12% Calculated: C 83.43%; H 4.38%; Si 12.19%.

The results of IR, $^1H$-NMR, $^{13}C$-NMR and $^{29}Si$-NMR measurements were identical to those observed in Example 3.

The yield of the product in Example 8 is improved as compared with that achieved in Example 3. In addition, the post-treatment adopted in Example 5 was Method 3 (comprising adding methanol to the reaction solution and then adding a saturated ammonium chloride aqueous solution to the resulting mixture), but the treatment adopted in the following Example 9 was Method 6 (comprising adding monochlorosilane to the reaction solution and then adding the reaction solution to an aqueous solution of hydrochloric acid).

EXAMPLE 9

Preparation of Poly(methylsilyleneethynylene-1,3-phenyeneethynylene)

The same procedures used in Example 5 were repeated to give an organic magnesium reagent. A solution of 2.48 g (21.4 mmol) of dichloromethylsilane in 20 ml of THF was dropwise added to the flask containing the organic magnesium reagent (21.5 mmol) at room temperature over 20 minutes with stirring and the reaction was continued for additional one hour while refluxing with heating. Then the reaction system was post-treated. More specifically, 2.18 g (20.1 mmol) of tri-methylsilyl chloride ($Me_3SiCl$) was added to the reaction solution and the resulting mixture was stirred for additional one hour under refluxing. The temperature of the flask was returned back to room temperature. Another 500 ml volume flask was filled with 300 ml of a 0.5N hydrochloric acid aqueous solution and ice-cooled. A dropping funnel was fitted to the 500 ml flask, the reaction solution was transferred to the dropping funnel and then the reaction solution in the dropping funnel was slowly and dropwise added to the hydrochloric acid aqueous solution with stirring over 30 minutes. Thus, solid matter was formed, but it was dissolved when 50 ml of benzene was added to the solution. The resulting oil phase was separated using a separatory funnel and dried by adding sodium sulfate and allowing to stand overnight. The solution was filtered through a glass filter to remove the dehydrating agent. The solvent was distilled off from the solution using an evaporator to give a viscous oily crude product (yield of the crude product: 98%). The crude product was dissolved in 40 ml of THF, then dispersed in methanol to precipitate the product. The resulting precipitates were filtered off and dried to give 2.32 g (yield: 64%) of an intended polymer. The resulting polymer was a pale yellow solid and had weight-average and number-average molecular weights of 11,000 and 5,200 as determined by GPC.

Various properties of the resulting polymer were determined. The results are listed below.

(1) Elemental Analysis ($C_{11}H_8Si$): Found: C 78.17%; H 4.85%; Si 16.58% Calculated: C 78.52%; H 4.79%; Si 16.69%.

The results of IR, $^1H$-NMR, $^1C$-NMR and $^{29}Si$-NMR measurements were identical to those observed in Example 5.

The yield of the product in Example 9 is improved as compared with that achieved in Example 5. Moreover, when comparing the yields of the crude products of these Examples, that achieved in Example 5 was 68%, while that in Example 9 was 98%. In Example 5, about 30% of the raw material became insoluble in the solvent and accordingly was not recovered in the form of the crude product. On the other hand, almost all of the raw material was recovered in the form of the crude product in Example 9. The difference between the yield of the crude product and that of the purified product was mainly caused for reasons that low molecular weight fraction soluble in methanol was removed in the purification step.

One of the reasons why the yields vary depending on the kinds of the post-treatments is that Methods 5 and 6 would be most effective for inhibiting crosslinking of a part of hydrolyzates formed during the hydrolysis treatment. In fact, when preparing a polymer whose substituent R' of the silyl group was a hydrogen atom, the post-treatments 1 to 4 could not provide any polymer soluble in solvents at all and the products each mainly comprised a polymer insoluble in the solvents. For instance, the post-treatment 6 was employed in Examples 1 and 4, but when the polymers were prepared using the post-treatments 1 to 4, the yield of a polymer soluble in a solvent was extremely low on the order of not more than 10%. These results seem to indicate that the higher the reactivity of Si—H groups in a polymer, the greater the influence of the post-treatment adopted during the preparation on the yield of the polymer.

Example 10

Preparation of Poly(phenylsilyleneethynylene-1,3-phenyleneethynylene)

First of all, an organic magnesium reagent was prepared as follows. Flaky magnesium metal (1.21 g; 49.8 mmol) was introduced into a 300 ml volume 4-necked flask and the atmosphere in the flask was replaced with dry nitrogen gas. THF (20 ml) which had been dried with lithium aluminum hydride and then subjected to simple distillation was introduced into the flask, a small piece of iodine was added thereto and the mixture was stirred to activate magnesium. To the activated magnesium, there was dropwise added a solution of 4.91 g (45.1 mmol) of ethyl bromide in THF (20 ml) at room temperature over about 20 minutes and the mixture was reacted while refluxing with heating over 2 hours to give ethylmagnesium bromide. To the reaction system, there was dropwise added a solution of 2.72 g (21.6 mmol) of m-diethynylbenzene in THF (30 ml) at room temperature over 20 minutes with stirring and the reaction was continued for additional one hour while refluxing with heating to give an intended organic magnesium reagent (21.6 mmol).

Then a polymer was prepared in the following manner. The reaction was performed subsequent to the foregoing preparation of the organic magnesium reagent. A solution of 3.82 g (21.6 mmol) of dichlorophenylsilane in THF (20 ml) was dropwise added to the flask containing the organic magnesium reagent at room temperature over 20 minutes with stirring. White precipitates of the organic magnesium reagent disappeared immediately before the completion of the dropwise addition and the solution became almost clear. The reaction system was further reacted for one hour while refluxing with heating. Then the reaction system was post-treated. More specifically, 2.17 g (20.0 mmol) of trimethylsilyl chloride (Me$_3$SiCl) was added to the reaction solution. Another 500 ml volume flask was filled with 300 ml of a 0.1N aqueous solution of hydrochloric acid and ice-cooled. A dropping funnel was fitted to the 500 ml flask, the reaction solution in the 300 ml flask was transferred to the dropping funnel and the hydrochloric acid aqueous solution was gently stirred while slowly dropwise adding the reaction solution through the dropping funnel (over 30 minutes). Then benzene (50 ml) was added to the reaction solution and the resulting oil phase was separated using a separatory funnel and dried by adding sodium sulfate and allowing to stand overnight. The solution was filtered through a glass filter to remove the dehydrating agent. The solvent was distilled off from the solution using an evaporator to give a viscous oily crude product (yield: 98%). The crude product was dissolved in 40 ml of THF, dispersed in n-hexane to cause precipitation. The resulting precipitates were filtered off and dried to give 3.97 g (yield: 80%) of an intended polymer. The resulting polymer was a pale yellow solid and had weight-average and number-average molecular weights of 8,000 and 3,700 as determined by GPC.

Various properties of the resulting polymer were determined. The results are listed below.

(1) Elemental Analysis ($C_{16}H_{10}Si$): Found: C 83.18%; H 4.42%; Si 12.08% Calculated: C 83.43%; H 4.38%; Si 12.19%

(2) IR (film), cm$^{-1}$: 3070(w), 2162(s, Si—H), 1591(w), 1476(m), 1430(m), 1167(m), 1115(m), 950(m), 812(s, Si—H), 735(m), 697(m), 684(m)

(3) $^1$H-NMR (500 MHz, CDCl$_3$),δ(ppm): 7.9–7.3 (m, 9H, hydrogen atoms of benzene ring), 5.11 (s, 1H, Si—H)

(4) $^{13}$C-NMR (500 MHz, CDCl$_3$), δ(ppm): 134.8, 130.7, 129.9 and 128.3 (carbon atoms of phenyl group); 135.9, 132.9, 128.4 and 122.6 (carbon atoms of phenylene group); 107.2 and 86.6 (carbon atoms of ethynylene group)

Figure 11:
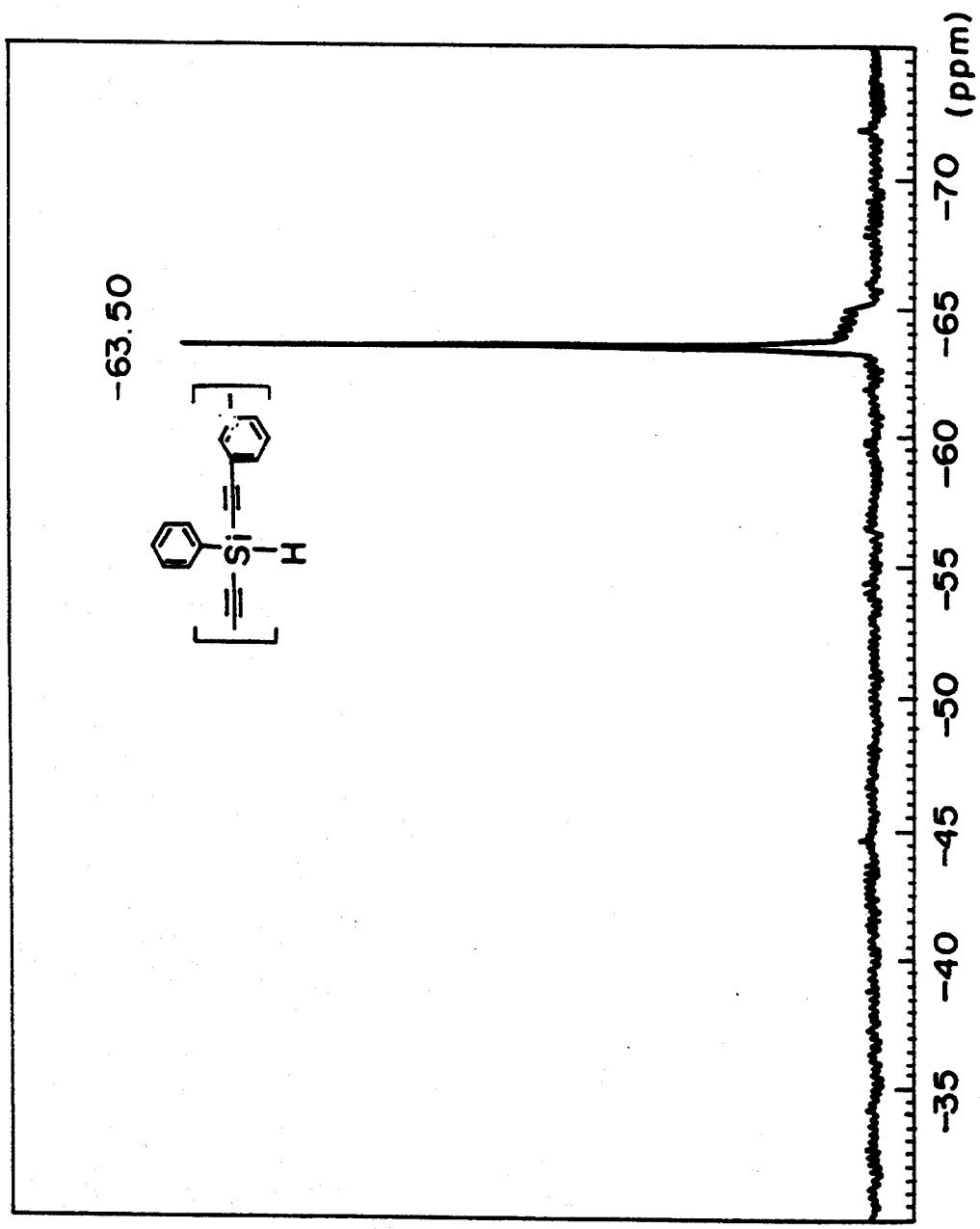
FIG. 11 is a chart showing $^{29}$Si-NMR spectra of the polymer prepared in Example 10.

(5) $^{29}$Si-NMR (500 MHz, CDCl$_3$),δ(ppm): −63.5, determined according to the proton-decoupling method (non-NOE Mode) (FIG. 11).

EXAMPLE 11

Preparation of Hardened Product

First of all, poly(phenylsilyleneethynylene-1,3-phenyleneethynylene) was prepared. To a 200 ml volume reaction vessel of glass, there were charged 16.5 g of MgO which had been prepared by firing Mg(OH)$_2$ at 500° C. for 3 hours with evacuation, 6.42 g of phenylsilane, 7.50 g of m-diethynylbenzene and 120 ml of benzene as a solvent. Then these reactants were reacted, in an argon atmosphere, at room temperature for 8 hours, at 50° C. for 8 hours and then 80° C. for 2 hours (18 hours in total). After completion of the reaction, the reaction solution was filtered through a glass filter to separate and remove the MgO present therein. The resulting filtrate was distilled under reduced pressure to remove the solvent to give 9.9 g (yield 71%) of a polymer. The polymer was a yellow solid and the structure thereof was confirmed by IR and NMR spectroscopic measurements. The polymer was found to have weight-average and number-average molecular weights of 4,800 and 2,510 respectively (as determined by GPC: polystyrene standard).

Preparation of Hardened Product

Figure 12:
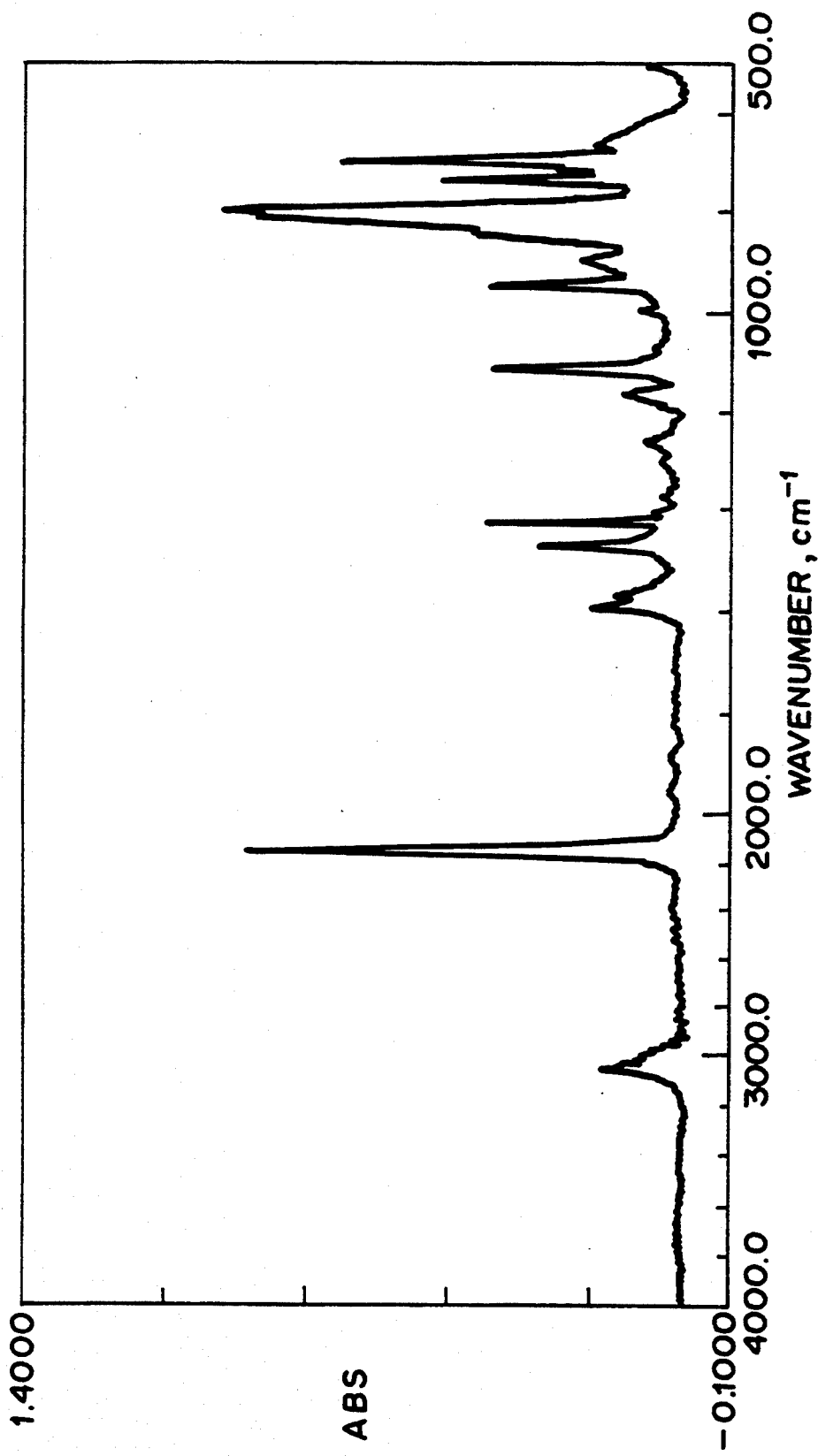
FIG. 12 is a chart showing infrared spectra of the hardened product prepared in Example 11.

The resulting polymer was heat-treated at 300° C. for one hour in an argon gas atmosphere to give an intended solid hardened product of orange color. The results of IR measurement of the hardened product are shown in FIG. 12. Then thermal properties of the hardened product were determined by TGA-DTA. In the argon gas atmosphere, the polymer showed almost no loss in weight, the remaining weight of the polymer at a temperature of 1000° C. was 94% and the Td$_5$ value (i.e., the temperature at which the loss in weight is 5%) was found to be 860° C. In the air, on the other hand, the remaining weight of the polymer at a temperature of 1000° C. was 28% and the Td$_5$ value was 580° C. These results are summarized in the following Table 1. These values are higher than those observed on polyimide (Kapton) which has a remaining weight at 1000° C. of 55% and a Td$_5$ of 586° C. as determined in an argon atmosphere and a remaining weight at 1000° C. of 4% and a Td5 of 568° C. as determined in an air atmosphere, and this clearly indicates that the hardened product of the present invention is quite excellent in heat resistance and resistance to burning.

EXAMPLE 12

The same procedures used in Example 11 were repeated except that the silicon-containing polymer was heat-treated at 400° C. to determine thermal properties of the resulting hardened product. The results thus obtained are listed in Table 1.

EXAMPLE 13

The polymer prepared in Example 8 was heat-treated at 300° C. for one hour in an argon gas atmosphere to give an intended solid hardened product of orange color. Then thermal properties of the hardened product were determined by TGA-DTA. As a result, it was found that, in the argon gas atmosphere, the polymer showed quite high heat-resistant characteristics, for instance, it showed almost no loss in weight, the remaining weight of the polymer at a temperature of 1000° C. was 90% and the Td5 value was 577° C. It was also found that the polymer was likewise excellent in resistance to burning since, in the air, the remaining weight of the polymer at a temperature of 1000° C. was 27% and the Td5 value was 476° C. These results are summarized in the following Table 1.

EXAMPLES 14 to 16

A variety of silicon-containing polymers were prepared according to the method used in Example 11 and they were heat-treated at a predetermined temperature for one hour to give each corresponding hardened product. Thermal properties of these hardened products were determined by TGA-DTA. The results thus obtained are listed in Table 1.

Comparative Examples 1 to 3

There were prepared three kinds of silicon-containing compounds having structures (repeating units comprise only Si—H bonds or C≡C) similar to those of the polymers of the present invention, i.e., polymers each comprising repeating units represented by the following structural formula (52), (53) or (54):

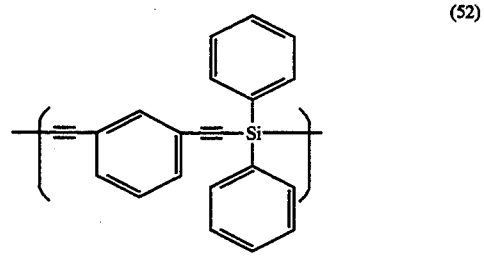

(52)

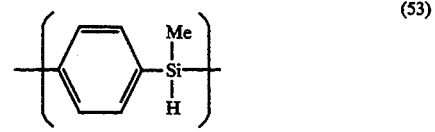

(53)

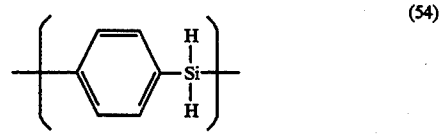

(54)

and these polymers were hardened in the same manner used above to evaluate thermal properties thereof. The results thus obtained are summarized in the following Table 1. As will be apparent from the results listed in Table 1, the hardened product produced from the silicon-containing compound having both Si—H bonds and C≡C bonds in the repeating unit according to the present invention clearly exhibits high heat resistance and resistance to burning.

TABLE 1

Thermal Properties of Various Kinds of Si-Containing Hardened Products

| Ex. No. | Repeating Unit of Si-Containing Polymer | Heat-Treatment Temp. (Hardening Reaction) | In Ar Gas Atm. | | In the Air | |
|---|---|---|---|---|---|---|
| | | | Remaining Wt. at 1000° C. | Td5 °C. | Remaining Wt. at 1000° C. | Td5 °C. |
| 11 | Structural Formula (33) | 300° C. | 94 | 860 | 28 | 580 |
| 12 | Structural Formula (33) | 400° C. | 94 | 880 | 29 | 583 |
| 13 | Structural Formula (34) | 300° C. | 90 | 577 | 27 | 476 |
| 14 | Structural Formula (27) | 300° C. | 88 | 561 | 28 | 567 |
| 15 | Structural Formula (2) | 300° C. | 97 | >1000 | 34 | 572 |
| 16 | Structural Formula (30) | 300° C. | 94 | 805 | 32 | 573 |
| 1* | Structural Formula (52) | 400° C. | 81 | 547 | 14 | 525 |
| 2* | Structural Formula (53) | 300° C. | 75 | 320 | 45 | 550 |
| 3* | Structural Formula (54) | 300° C. | 21 | 355 | — | — |

What is claimed is:

1. A poly(silyleneethynylene phenyleneethynylene) having a repeated unit represented by the following structural formula (1A):

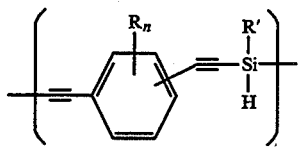

wherein the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; and n is an integer ranging from 0 to 4; the substituent R' of the silylene group represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms when the phenylene group is in the o- or p-form, or the substituent R' is a hydrogen atom, an alkyl group having 1 to 20 carbon atoms, an alkenyl group having 2 to 20 carbon atoms, an alkynyl group having 2 to 20 carbon atoms or an aromatic group having 7 to 20 carbon atoms when the phenylene group is in the m-form and n is 0, or the substituent R' is a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms when the phenylene group is in the m-form and n is an integer ranging from 1 to 4, provided that the hydrogen atoms linked to the carbon atoms of the substituent R' may partially or completely be replaced with halogen atoms, alkoxy groups, phenoxy groups, disubstituted amino groups or silanyl groups.

2. A poly(silyleneethynylene-1,3-phenyleneethynylene) comprising a repeating unit represented by the following structural formula (2):

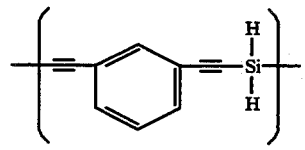

3. A method for preparing a poly(silyleneethynylene phenyleneethynylene) having a repeated unit represented by the following structural formula (1B):

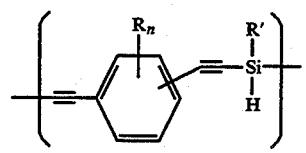

wherein the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atom of the substituent R may partially or completely be replaced with halogen atoms, alkoxy groups, phenoxy groups, disubstituted amino groups or silanyl groups; and n is an integer ranging from 0 to 4; the substituent R' of the silylene group represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms, provided that the hydrogen atoms linked to the carbon atoms of the substituent R' may partially or completely be replaced with halogen atoms, alkoxy groups, phenoxy groups, disubstituted amino groups or silanyl groups comprising reacting an organic magnesium reagent represented by the following structural formula (3):

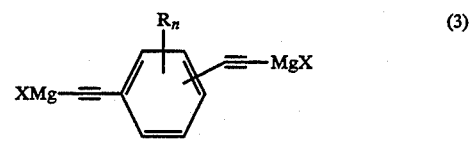

wherein the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; n is an integer ranging from 0 to 4; and X represents an atom selected from the group consisting of Cl, Br and I with dichlorosilanes represented by the following structural formula (4):

wherein the substituent R' represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms, provided that the hydrogen atoms linked to the carbon atoms of the substituent R' may partially or completely be replaced with halogen atoms, alkoxy groups, phenoxy groups, disubstituted amino groups or silanyl groups in the presence of a solvent free of any active hydrogen atom.

4. The method of claim 3 wherein the solvent free of active hydrogen atom is an ether solvent.

5. A method for preparing a poly(silyleneethynylene phenyleneethynylene) having a repeated unit represented by the following structural formula (1B):

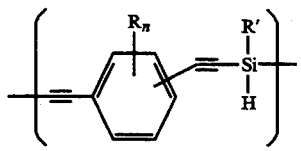
(1B)

wherein the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; and n is an integer ranging from 0 to 4; the substituent R' of the silylene group represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms, provided that the hydrogen atoms linked to the carbon atoms of the substituent R' may partially or completely be replaced with halogen atoms, alkoxy groups, phenoxy groups, disubstituted amino groups or silanyl groups comprising reacting an organic magnesium reagent represented by the following structural formula (3):

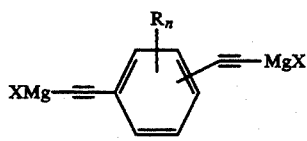
(3)

wherein the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; n is an integer ranging from 0 to 4; and X represents an atom selected from the group consisting of Cl, Br and I with dichlorosilanes represented by the following structural formula (4):

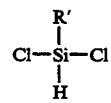
(4)

wherein the substituent R' represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms, provided that the hydrogen atoms linked to the carbon atoms of the substituent R' may partially or completely be replaced with halogen atoms, alkoxy groups, phenoxy groups, disubstituted amino groups or silanyl groups in the presence of a solvent free of any active hydrogen atom; then treating the reaction product with a monochlorosilane represented by the following structural formula (5):

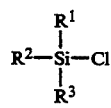
(5)

(wherein $R^1$ to $R^3$ may be identical to or different from one another and each represents a hydrogen atom, an alkyl group having 1 to 20 carbon atoms, an alkenyl group having 2 to 20 carbon atoms, an alkynyl group having 2 to 20 carbon atoms, a phenyl group having 6 to 20 carbon atoms or a silanyl group having 1 to 10 silicon atoms) and hydrolyzing the resulting product.

6. The method of claim 5 wherein the solvent free of active hydrogen atom is an ether solvent.

7. A poly(silyleneethynylene phenyleneethynylene) having a repeated unit represented by the following structural formula (1B):

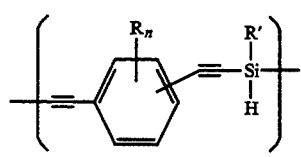
(1B)

wherein the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; and n is an integer ranging from 0 to 4; the substituent R' of the silylene group represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms, provided that the hydrogen atoms linked to the carbon atoms of the substituent R' may partially or completely be replaced with halogen atoms, alkoxy groups, phenoxy groups, disubstituted amino groups or silanyl groups, which is free of structural defect on the main chain thereof due to branching and/or crosslinking and which is prepared by reacting an organic magnesium reagent represented by the following structural formula (3):

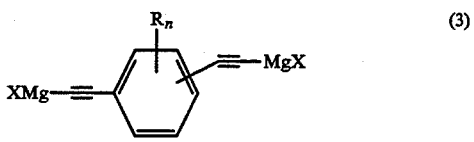

wherein the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; n is an integer ranging from 0 to 4; and X represents an atom selected from the group consisting of Cl, Br and I with dichlorosilanes represented by the following structural formula (4):

wherein the substituent R' represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms, provided that the hydrogen atoms linked to the carbon atoms of the substituent R' may partially or completely be replaced with halogen atoms, alkoxy groups, phenoxy groups, disubstituted amino groups or silanyl groups in the presence of a solvent free of any active hydrogen atom.

8. A hardened product obtained by heat-treating, at a temperature ranging from 50° to 700° C., a poly(silyleneethynylene phenyleneethynylene) having a repeated unit represented by the following structural formula (1B):

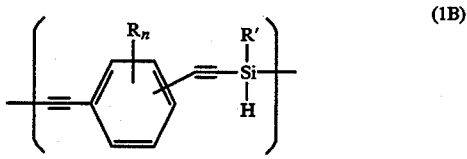

wherein the phenylene group may be in the o-, m- or p-form, the substituent R of the phenylene group represents a halogen atom, an alkyl group having 1 to 20 carbon atoms, an alkoxy group having 1 to 20 carbon atoms, a phenoxy group having 6 to 20 carbon atoms, an alkenyl group having 2 to 20 carbon atoms, an alkynyl group having 2 to 20 carbon atoms, an aromatic group having 6 to 20 carbon atoms, a disubstituted amino group having 2 to 20 carbon atoms or a silanyl group having 1 to 10 silicon atoms, provided that the hydrogen atoms linked to the carbon atoms of the substituent R may partially or completely be replaced with halogen atoms, alkoxy groups, phenoxy groups, disubstituted amino groups or silanyl groups; and n is an integer ranging from 0 to 4; the substituent R' of the silylene group represents a hydrogen atom, an alkyl group having 1 to 20 carbon atoms, an alkenyl group having 2 to 20 carbon atoms, an alkynyl group having 2 to 20 carbon atoms or an aromatic group having 6 to 20 carbon atoms, provided that the hydrogen atoms linked to the carbon atoms of the substituent R' may partially or completely be replaced with halogen atoms, alkoxy groups, phenoxy groups, disubstituted amino groups or silanyl groups; which is free of structural defect on the main chain thereof due to branching and/or crosslinking.

9. The hardened product obtained by heat-treating, at a temperature ranging from 5° to 700° C., poly(silyleneethynylene-1,3-phenyleneethynylene) comprising a repeating unit represented by the following structural formula (2):

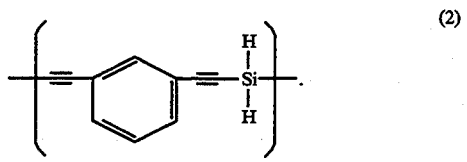

10. The hardened product of claim 8 wherein the poly(silyleneethynylene phenyleneethynylene) has a weight-average molecular weight ranging from 500 to 1,000,000.

11. The hardened product of claim 9 wherein the poly(silyleneethynylene phenyleneethynylene) has a weight-average molecular weight ranging from 500 to 1,000,000.

12. The hardened product of claim 8 wherein the heat-treatment is carried out at a temperature ranging from 100° to 400° C.

13. The hardened product of claim 9 wherein the heat-treatment is carried out at a temperature ranging from 100° to 400° C.

14. The hardened product of claim 10 wherein the heat-treatment is carried out at a temperature ranging from 100° to 400° C.

15. The hardened product of claim 11 wherein the heat-treatment is carried out at a temperature ranging from 100° to 400° C.

16. The hardened product of claim 8 wherein the heat-treatment is carried out in an atmosphere comprising air, nitrogen gas or an inert gas.

17. The hardened product of claim 9 wherein the heat-treatment is carried out in an atmosphere comprising air, nitrogen gas or an inert gas.

18. The hardened product of claim 10 wherein the heat-treatment is carried out in an atmosphere comprising air, nitrogen gas or an inert gas.

19. The hardened product of claim 11 wherein the heat-treatment is carried out in an atmosphere comprising air, nitrogen gas or an inert gas.

20. The hardened product of claim 12 wherein the heat-treatment is carried out in an atmosphere comprising air, nitrogen gas or an inert gas.

21. The hardened product of claim 13 wherein the heat-treatment is carried out in an atmosphere comprising air, nitrogen gas or an inert gas.

22. The hardened product of claim 14 wherein the heat-treatment is carried out in an atmosphere comprising air, nitrogen gas or an inert gas.

23. The hardened product of claim 15 wherein the heat-treatment is carried out in an atmosphere comprising air, nitrogen gas or an inert gas.

* * * * *